United States Patent
Suyama et al.

(10) Patent No.: US 10,736,486 B2
(45) Date of Patent: Aug. 11, 2020

(54) STICKY CLEANER

(71) Applicants: KABUSHIKI KAISHA NITOMS, Tokyo (JP); NITTO DENKO CORPORATION, Ibaraki-shi, Osaka (JP)

(72) Inventors: Yosuke Suyama, Tokyo (JP); Teiji Sakashita, Tokyo (JP); Hiroyuki Noma, Tokyo (JP)

(73) Assignees: KABUSHIKI KAISHA NITOMS, Shinagawa-ku, Tokyo (JP); NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/749,337

(22) PCT Filed: Mar. 22, 2017

(86) PCT No.: PCT/JP2017/011434
§ 371 (c)(1),
(2) Date: Jan. 31, 2018

(87) PCT Pub. No.: WO2018/008201
PCT Pub. Date: Jan. 11, 2018

(65) Prior Publication Data
US 2018/0220871 A1 Aug. 9, 2018

(30) Foreign Application Priority Data
Jul. 6, 2016 (JP) .................. 2016-134455

(51) Int. Cl.
*A47L 25/00* (2006.01)
*C09J 153/00* (2006.01)
(Continued)

(52) U.S. Cl.
CPC .............. *A47L 25/005* (2013.01); *B32B 3/30* (2013.01); *C09J 7/38* (2018.01); *C09J 7/383* (2018.01);
(Continued)

(58) Field of Classification Search
CPC ......... A47L 25/005; B32B 3/30; C09J 153/00
See application file for complete search history.

(56) References Cited

U.S. PATENT DOCUMENTS

| | | | |
|---|---|---|---|
| 2,673,042 A * | 3/1954 | Fritzinger | A47L 25/005 15/104.002 |
| 2005/0234199 A1* | 10/2005 | Taniguchi | C08F 293/005 525/242 |
| 2012/0175864 A1* | 7/2012 | Kennedy | B32B 37/12 281/38 |

FOREIGN PATENT DOCUMENTS

| CN | 103254815 A | 8/2013 |
|---|---|---|
| JP | 54-062238 A | 5/1979 |

(Continued)

OTHER PUBLICATIONS

Examiner's Decision of Refusal dated May 2, 2017 issued by the Japanese Patent Office in Application No. 2016-134455.
(Continued)

*Primary Examiner* — Victor S Chang
(74) *Attorney, Agent, or Firm* — Sughrue Mion, PLLC

(57) ABSTRACT

Provided is a sticky cleaner whose adhesive face can be easily renewed and whish is less susceptible to roll-loosening. The sticky cleaner provided by this invention comprises a PSA tape having an adhesive face on the first face of a substrate. The PSA tape forms a PSA tape roll wound with the adhesive face on the outside. On the first face of the substrate, the PSA tape comprises a first layer formed of a PSA and a second layer formed of an acrylic viscoelastic material. The adhesive face comprises first sections where
(Continued)

the first layer is exposed and second sections where the second layer is exposed. The second sections protrude further out of the PSA tape roll relative to the first sections. The PSA tape roll shows an unwinding force $F_0$ at 0° C. and an unwinding force $F_{30}$ at 30° C.

15 Claims, 4 Drawing Sheets

(51) Int. Cl.
  *C09J 201/00* (2006.01)
  *C09J 7/38* (2018.01)
  *C09J 153/02* (2006.01)
  *B32B 3/30* (2006.01)

(52) U.S. Cl.
  CPC ........... *C09J 153/00* (2013.01); *C09J 153/02* (2013.01); *C09J 153/025* (2013.01); *C09J 201/00* (2013.01); *B32B 2307/748* (2013.01); *B32B 2405/00* (2013.01); *C09J 2201/28* (2013.01); *C09J 2201/32* (2013.01); *C09J 2201/36* (2013.01); *C09J 2400/226* (2013.01); *C09J 2400/283* (2013.01); *C09J 2421/00* (2013.01); *C09J 2433/00* (2013.01); *C09J 2453/00* (2013.01)

(56) References Cited

FOREIGN PATENT DOCUMENTS

| JP | 9-227839 A | 9/1997 |
|----|---|---|
| JP | 2007-084638 A | 4/2007 |
| JP | 2007-117534 A | 5/2007 |
| JP | 2007-307272 A | 11/2007 |
| JP | 2009-219574 A | 10/2009 |
| JP | 4834377 B2 | 12/2011 |
| JP | 2016-116795 A | 6/2016 |
| WO | 2011/004662 A1 | 1/2011 |

OTHER PUBLICATIONS

Examiner's Decision of Refusal dated Sep. 7, 2017 issued by the Japanese Patent Office in Application No. 2016-134455.
Examiner's Decision of Refusal dated Sep. 7, 2017 issued by the Japanese Patent Office in Application No. 2017-129128.
International Search Report for PCT/JP2017/011434 dated May 16, 2017 [PCT/ISA/210].
First Notification for Reasons for Refusal dated Sep. 20, 2018, from State Intellectual Property Office of the P.R.C. in counterpart application No. 201780001132.8.
Third Office Action dated Oct. 9, 2019 from the State Intellectual Property Office of the P.R.C. in application No. 201780001132.8.
Notification of Reason for Refusal dated May 27, 2019 issued by the Korean Intellectual Property Office in counterpart application No. 10-2019-7002160.
Second Notification of Reasons for Refusal dated May 21, 2019, issued in China National Intellectual Property Administration (CNIPA) in corresponding application No. 201780001132.8.
Fourth Office Action dated Mar. 17, 2020 in Chinese Application No. 201780001132.8.
Office Action dated Apr. 21, 2020 in Taiwanese Application No. 106114921.
Extended European Search Report dated May 18, 2020 in European Application No. 17823809.3.
Notification of Reasons for Refusal dated May 28, 2020 in Japanese Application No. 2017-248594.

* cited by examiner

STICKY CLEANER

TECHNICAL FIELD

This application is a National Stage of International Application No. PCT/JP2017/011434, filed on Mar. 22, 2017, which claims priority to Japanese Patent Application No. 2016-134455 filed on Jul. 6, 2016; the entire contents thereof are incorporated herein by reference.

The present invention relates to a sticky cleaner.

BACKGROUND ART

As a means to clean floors, carpets, etc., a sticky cleaner (dirt-collecting device) using pressure-sensitive adhesive (PSA) tape is widely used. In the sticky cleaner, the PSA tape is in an embodiment where it has an adhesive face on a strip of substrate and is wound in a roll with the adhesive face on the outside, forming a PSA tape roll; and the adhesive face can be rolled over in contact with a surface to be cleaned such as a floor surface to collect dust (substances to be removed such as waste matters) on the surface to be cleaned. Technical documents related to this type of art include Patent Documents 1 and 2.

CITATION LIST

Patent Literature

[Patent Document 1] WO 2011/004662
[Patent Document 2] Japanese Patent Application Publication No. 2009-219574

SUMMARY OF INVENTION

Technical Problem

As for such a PSA tape roll, when the adhesive strength weakens upon a large accumulation of dust on the roll surface (the outermost circumferential adhesive face of the PSA tape), the outermost circumferential part of the PSA tape can be withdrawn (unwound) from the roll and cut off to expose a new adhesive face on the roll surface. In other words, it is constructed so that by the withdrawing and cutting procedure, the adhesive face exposed on the roll surface can be renewed to maintain desirable adhesive strength. In the procedure for renewing the adhesive face, when the force required for withdrawal of the PSA tape from the roll (i.e. the unwinding force, or the force resistive to the unwinding) is excessively large, the PSA tape is likely to tear or split against the will (at an unintended location) and the use of the PSA tape roll may be hindered. Especially, at a low temperature, such tearing and splitting are more likely to occur since the unwinding force tends to increase as compared to at room temperature. On the other hand, when the unwinding force is small, rolling the PSA tape roll over the target surface (a surface to be cleaned) is likely to cause so-called rail drawing which is a situation where the adhesive strength between the PSA tape and the target surface overcomes the unwinding force, causing adhesion of the PSA tape to the target surface accompanying unrolling of the roll. In addition, when the unwinding force is small, loosening of the PSA tape roll (roll-loosening, i.e. lifting or opening of the winding end edge of the PSA tape from the outer surface of the inner circumferential of the roll) is likely to develop when not in use (during storage). The loosening of the PSA tape may not only degrade the appearance of the PSA tape roll, but also cause issues such as accumulation of dust from the air onto the adhesive face causing a decrease in adhesive strength.

An objective of this invention is to provide a sticky cleaner whose adhesive face can be easily renewed and which is less susceptible to roll-loosening.

Solution to Problem

This description provides a sticky cleaner that comprises a PSA tape having an adhesive face on a first face of a substrate. The PSA tape constitutes a PSA tape roll wound with the adhesive face on the outside. On the first face of the substrate, the PSA tape has a first layer formed of a PSA and a second layer formed of a viscoelastic material. The viscoelastic material forming the second layer is typically an acrylic viscoelastic material. The adhesive face comprises a first section where the first layer is exposed and a second section where the second layer is exposed. Relative to the first section, the second section protrudes further out of the PSA tape roll. The PSA tape roll exhibits an unwinding force $F_0$ at 0° C. and an unwinding force $F_{30}$ at 30° C. $F_0$ being up to 10 times $F_{30}$. Such an embodiment can favorably achieve both easy renewal of the adhesive face and inhibition of roll-loosening.

Second sections are preferably formed separated by spaces in the width direction. According to such an embodiment, the plurality of second sections are used as spacers to allow suitable control of the tightness of adhesion between interleaving sections (e.g. first sections) and the surface being cleaned or the backside of the PSA tape. Here, the "backside" of the PSA tape refers to the face opposite of the front face of the PSA tape that comes in contact with an article, that is, the face on the inside of the PSA tape roll.

In a preferable embodiment the second sections are formed as lines running in the length direction of the PSA tape. As in this embodiment, when the second sections protruding further than the first sections are formed as lines running in the length direction (in the circumferential direction of the PSA tape roll), the procedures of withdrawing the PSA tape from the PSA tape roll and rolling the PSA tape roll over the target surface can be carried out smoothly.

In an embodiment of the sticky cleaner disclosed herein, the second layer has a cross-sectional area A (mm²) in the width direction of the PSA tape and a percent (%) weight R of the elastomer content in the second layer, having a product (an AR value) equal to or less than 2.5. Such an embodiment can facilitate hand-tearing of the PSA tape.

In a preferable embodiment, lines of the second layer are placed, running in the length direction of the PSA tape, separated by spaces in the width direction of the PSA tape. Such an embodiment allows suitable control of the tightness of adhesion to the surface being cleaned and to the backside of the PSA tape. It also allows smooth withdrawal of the PSA tape from the PSA tape roll as well as smooth rotation of the PSA tape roll over the surface subject to cleaning.

As the acrylic viscoelastic material forming the second layer, a viscoelastic material comprising an acrylic block copolymer as the base polymer can be preferably used. The art disclosed herein can be favorably implemented in an embodiment using such an acrylic viscoelastic material.

The second layer can comprise a filler. The art disclosed herein can be favorably implemented in an embodiment where the second layer has such a composition.

In a preferable embodiment, the first layer is a rubber-based PSA layer. The art disclosed herein can be favorably implemented in an embodiment where the first layer is formed of a rubber-based PSA and the second layer is formed of an acrylic viscoelastic material.

In a preferable embodiment, the PSA tape roll has cut holes running in a direction intersecting the length direction. e.g. the width direction, of the PSA tape. Such cut holes are used to help separate part of the PSA tape from the rest so as to facilitate renewal of the adhesive face of the PSA tape roll.

In an area up to one-fourth the circumference inward from the winding end edge of the PSA tape, the sticky cleaner disclosed herein may have an anti-rail-drawing portion where the adhesiveness of the PSA tape is reduced. With such a configuration, the anti-rail-drawing portion can effectively prevent rail drawing, but the presence of the anti-rail-drawing portion is likely to cause loosening of the PSA tape. Thus, it is particularly meaningful to apply the present invention to inhibit loosening of the PSA tape.

DESCRIPTION OF EMBODIMENTS

Figure 1:
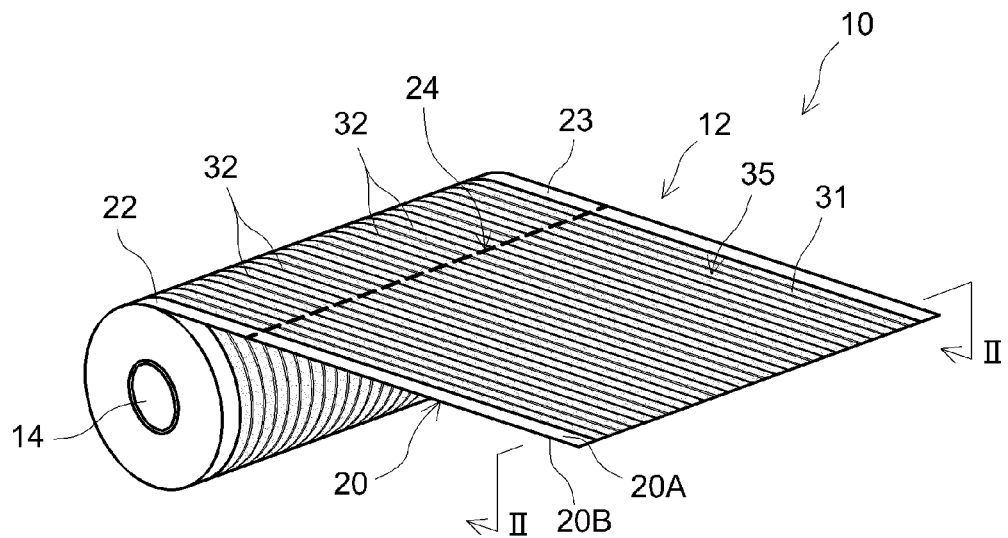
FIG. 1 shows a perspective diagram schematically illustrating the PSA tape roll of the sticky cleaner according to an embodiment.

Preferred embodiments of the present invention are described below. Matters necessary to practice this invention other than those specifically referred to in this description may be understood to a person ordinarily skilled in the art based on the teachings about embodiments of the invention in this description and common technical knowledge at the time the application was filed. The present invention can be implemented based on the contents disclosed herein and common technical knowledge in the subject field. In the following drawings, members and sites providing the same effect may be indicated by the same reference numeral, and redundant descriptions may be omitted or simplified. The embodiments in the drawings are schematically illustrated for clearly describing the present invention, and do not necessarily represent the dimensions or scales of an actual product.

Several embodiments of the sticky cleaner provided by the present invention are described with reference to drawings.

First Embodiment

Figure 2:
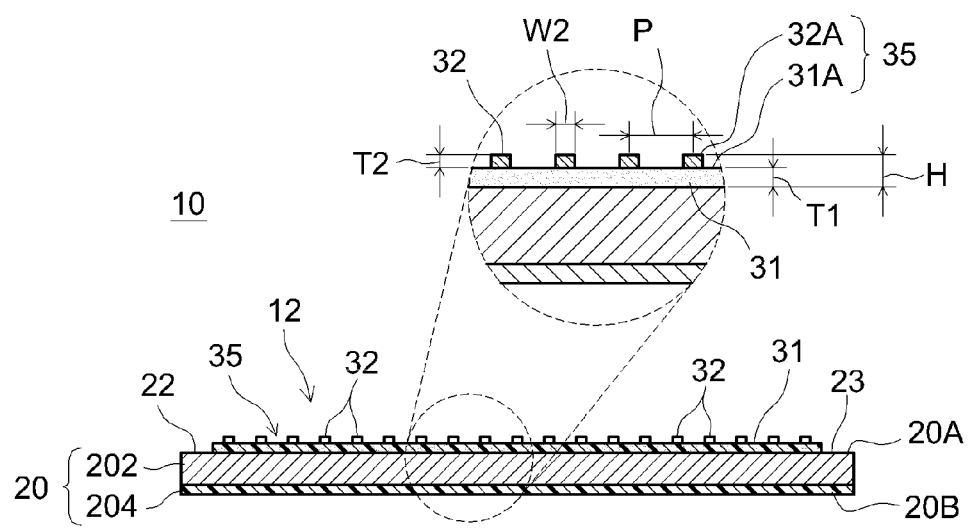
FIG. 2 shows a cross-sectional diagram at line II-II in FIG. 1.

FIG. 1 shows a perspective view of the PSA tape roll in the sticky cleaner according to an embodiment. FIG. 2 shows its cross section at line II-II. PSA tape roll 10 is obtained from PSA tape 12 having an adhesive face 35 formed on the first face 20A of a tape (a long strip) of substrate 20, by winding PSA tape 12 around a core 14 in a roll with the adhesive face 35 on the outside (on the outer circumference of the roll). From the standpoint of the cost, the ease of disposal, the cushioning properties, etc. as the core 14, a core made of paper (typically cardboard) can be preferably used. Alternatively, a core made of other material (e.g. synthetic resin) can be used as well. The PSA tape roll can be of the so-called core-free type, obtainable by winding solely PSA tape 12 in a roll without using core 14. That is, in the present invention, the core 14 is an optional constituent.

PSA tape 12 is provided with cut holes 24 for tearing at intervals approximately equal to the circumference of the roll. Cut holes 24 provide a cutting means to facilitate cutting an end piece (a piece at one terminal of the length direction) of PSA tape 12 off the rest. Examples include a row of long holes or wavy slits, and intermittent slits such as a perforation. In the example shown in FIG. 1, cut holes 24 are provided in the width direction (a direction perpendicularly intersecting the length direction) of PSA tape 12, but can be provided diagonally to the width direction. The direction in which the cut holes run may stay the same or change somewhere in the middle. For instance, somewhere in the middle of the width of the PSA tape, there may be one, two or more points where the direction in which the cut holes run changes in an angular or curved manner. In the example shown in FIG. 1, cut holes 24 are provided across the entire width of PSA tape 12. Alternatively, cut holes 24 can be provided from one end of the width of PSA tape 12 up to a certain point in the middle so as to provide a start point of cutting.

Figure 3:
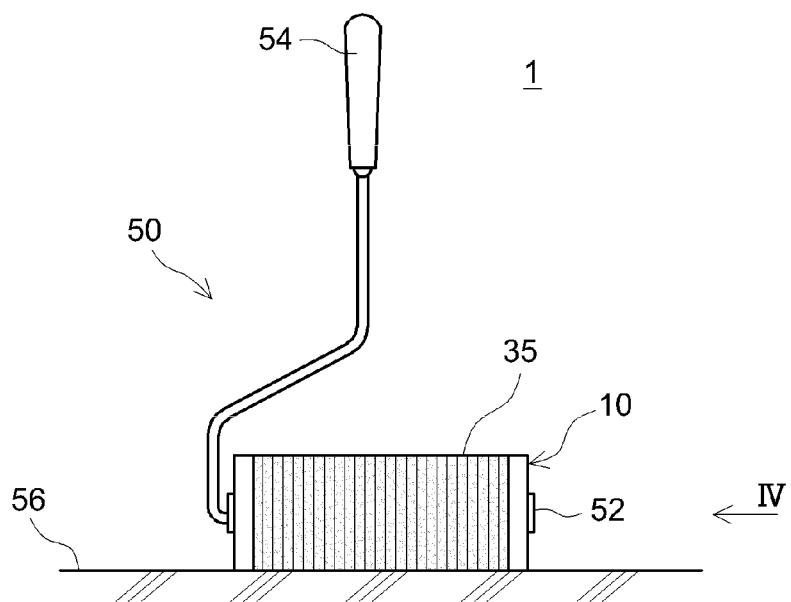
FIG. 3 shows a front view schematically illustrating the sticky cleaner according to an embodiment.

PSA tape roll 10 in such an embodiment can be used along with, for instance, a jig 50 as shown in FIG. 3, in a sticky cleaner 1 with PSA tape roll 10 being attached to a rolling member 52 of the jig 50. Rolling member 52 is bar-shaped and is supported on one end of a holding bar 54 in a freely rotatable manner. Sticky cleaner 1 is configured where rolling member 52 is inserted into core 14 of PSA tape roll 10 so that PSA tape roll 10 and rolling member 52 rotate together in the circumferential direction of the roll.

The form of the jig constituting the sticky cleaner is not limited to the particular kind shown in FIG. 3. Various jigs can be used in accordance with the purpose and application. The sticky cleaner provided by this description is not limited to an embodiment comprising a jig and a PSA tape roll as shown in FIG. 3. The PSA tape roll can be used as is as a sticky cleaner. That is, the PSA tape roll disclosed herein can be thought as a sticky cleaner as well. The concept of sticky cleaner provided by this description encompasses a PSA tape roll used as a sticky cleaner refill that is attached as necessary to a suitable jig in an exchangeable manner or for one time use.

In the following, the constitution of PSA tape 12 is described further in detail. PSA tape 12 has substrate 20, the first layer 31 formed on the first face 20A thereof, and the second layer 32 formed partially on the first layer 31. The first layer 31 is a layer formed of a PSA: in the present embodiment, it is a rubber-based PSA layer formed of a rubber-based PSA. The second layer 32 is a layer formed of a viscoelastic material, typically an acrylic viscoelastic layer formed of an acrylic viscoelastic material. The adhesive face 35 shows adhesiveness as a whole with an alternating array of first sections 31A where the first layer 31 is exposed and second sections 32A where the second layer 32 is exposed. Here, relative to the first sections 31A, the second sections 32A protrude further out (to the outer circumference side) of PSA tape roll 10. With such a constitution, when PSA tape 12 is wound in a roll (i.e. in the embodiment of PSA tape roll 10), the surface area where the first layer 31 directly adheres to the backside 20B of PSA tape 12 can be reduced, thereby facilitating withdrawal (unwinding) of PSA tape 12 from PSA tape roll 10.

The adhesive face 35 may cover the entire first face 20A of substrate 20 (i.e. at least either the first layer 31 or the second layer 32 is present in every part of the face), or may not be present in some areas. For instance, as shown in FIGS. 1 and 2, along the two edges of the width direction (the two lengthwise edges) of substrate 20, there may be non-adhesive areas (dry edges) 22 and 23 where the adhesive face 35 is not formed. Each of the non-adhesive areas 22 and 23 can have a width of, for instance, about 1 mm to 20 mm (typically 3 mm to 15 mm). The widths of the non-adhesive areas 22 and 23 can be the same or different. Alternatively, only one of the lengthwise edges may be provided with a non-adhesive area. With respect to the entire length of substrate 20, the non-adhesive area can be provided only partially in a continuous or intermittent manner.

In this embodiment, the first layer 31 is formed (spread) evenly and continuously in the entire area of substrate 20 or in some areas leaving out the non-adhesive areas. The thickness (T1 in FIG. 2) of the first layer 31 can be suitably selected to obtain desirable adhesive properties in accordance with the application of PSA tape roll 10. The thickness T1 of the first layer 31 is usually suitably 2 µm or greater, 5 µm or greater, or even 10 µm or greater. A large thickness T1 of the first layer 31 tends to enhance the cleaning ability (typically the ability to collect dust on the surface being cleaned). On the other hand, from the standpoint of making a smaller, lighter PSA tape roll 10 and saving resources, the thickness T1 of the first layer 31 is usually suitably about 50 µm or less, preferably about 35 µm or less, or even about 25 µm or less (e.g. about 20 µm or less). The surface of the continuously-formed first layer 31 may be smooth or may have micro contours (e.g. hairline texture). The micro contours on the surface of the first layer 31 can enhance the dust-collecting ability.

The planar shape, cross-sectional shape and arrangement of the second layer 32 can be selected to suitably reduce the area where the first layer 31 adheres directly to the second face (backside) 20B of PSA tape 12. For instance, in a preferable embodiment, several lines of the second layer 32 are arranged almost in parallel to one another. The planar shape of each line of the second layer 32 can be linear (straight), curvilinear, polygonal, wavy, etc. From the standpoint of the ease of manufacturing, the second layer 32 is preferably formed in straight lines. In this embodiment, on the first layer 31, straight lines of the second layer 32 running in the length direction of PSA tape 12 are arranged almost in parallel to one another (in a stripe pattern), separated by spaces in the width direction of the PSA tape 12. PSA tape roll 10 in such an embodiment is preferable because the structure (cross-sectional shape) of PSA tape 12 stays constant in cross sections lined in the length direction, with little fluctuation both in force of unwinding the tape in the length direction and in operational feeling (response from the resistance to operation) in relation to rolling of PSA tape roll 10 on the surface being cleaned (target surface). That is, the unwinding and the rolling can be carried out more smoothly. This can be advantageous from the standpoint of reducing rolling noise associated with its rotation on a hard, smooth surface such as a wood flooring surface, etc.

The PSA tape roll disclosed herein may be in an embodiment having a first group consisting of straight lines of the second layer running almost in parallel to one another in a first direction and a second group consisting of straight lines of the second layer running almost in parallel to one another in a direction intersecting (in typical, perpendicularly) the first direction. For instance, in an embodiment, the first group of lines of the second layer and the second group of lines of the second layer may be arrayed in a lattice pattern.

When the second layer 32 is formed in lines, the width (W2 in FIG. 2) of each line is not particularly limited and can be designed in accordance with the application (e.g. the material and the state of the surface to be cleaned, matters to be removed, etc.: the same applies hereinafter) as well as with the constitution of the first layer 31, dimensions of PSA tape roll 10, etc. In an embodiment, the line width W2 of the second layer 32 can be, for instance, about 0.1 mm or greater, about 0.15 mm or greater, about 0.2 mm or greater, or even about 0.3 mm or greater. W2 can be, for instance, about 5 mm or less, about 2 mm or less, about 1 mm or less, about 0.7 mm or less, or even about 0.5 mm or less. By adjusting W2, the unwinding force and the operational feeling during use can be adjusted. When the line width of the second layer 32 changes from place to place (e.g. the lines run while their width repeatedly fluctuates up and down in a gradual or stepwise manner), the aforementioned ranges of W2 values can be applied to the average line width of the second layer 32 over a certain length.

Preferably, the lines of the second layer 32 are arranged almost evenly over the entire adhesive face 35. For instance, in an embodiment as shown in FIGS. 1 and 2 where the lines of the second layer 32 are arranged almost in parallel to one another, the line pitch (P in FIG. 2) of the second layer 32 is preferably almost constant. The pitch P is not particularly limited and can be designed in accordance with the application, the constitution of the first layer 31, dimensions of PSA tape roll 10, etc. In an embodiment, the pitch P of the second layer 32 can be, for instance, about 0.5 mm or greater, usually suitably about 1 mm or greater, or possibly 1.5 mm or greater. The pitch P of the second layer 32 can be, for instance, about 10 mm or less, usually suitably about 5 mm or less, possibly about 4 mm or less, or even 3 mm or less.

In another embodiment of the PSA tape roll disclosed herein, the second layer can be formed in dots (spots or islets) arranged in a certain pattern or in a random manner. The shapes of the second layer dots are not particularly limited. Examples include circles, ovals, ellipsoids, circular sectors (e.g. semicircles), rings, quadrilaterals (squares, rectangles, trapezoids, *rhombi*, etc.), non-quadrilateral polygons (triangles, hexagons, etc.) as well as shapes representing various designs, symbols and letters. When the second layer 32 is formed in dots, each dot can have a surface area of, for instance, about 0.1 $mm^2$ or greater, or usually suitably about 0.5 $mm^2$ or greater (e.g. about 1 $mm^2$ or greater). The surface area of each dot can be, for instance, about 25 $mm^2$ or less, usually suitably about 10 $mm^2$ or less (e.g. about 5 $mm^2$ or less). Two adjacent dots of the second layer can be spaced apart by, for instance, about 0.1 mm to 10 mm (typically about 0.5 mm to 5 mm, e.g. about 1 mm to 3 mm).

Part of the adhesive face 35 is formed with the second sections 32A where the second layer 32 is exposed. The second sections 32A protrude further out, at least partially, relative to the first sections 31A. In such an embodiment, for instance, when the adhesive face 35 is rotated on a hard, smooth surface (a wood flooring surface, etc.) to clean the surface, the second sections 32A are more likely to come in contact with the target surface while the first sections 31A make limited contact with the target surface. This can prevent the resistance to operation to be excessively high during use and can also avoid rail drawing. On the other hand, when a flexible rough surface (a carpet surface, etc.) is cleaned, deformation of the target surface increases the area of contact between the first sections 31A and the target surface, giving rise to a good dust-collecting ability. Thus, the sticky cleaner in the present embodiment can be preferably used on surfaces of various materials and properties.

In this embodiment, the thickness T2 of the second layer is the protruding height of the second sections 32A relative to the first sections 31A. While no particular limitations are imposed, the protruding height T2 can be, for instance, about 10 µm or greater, about 20 µm or greater, about 30 µm or greater, or even about 40 µm or greater. A larger protruding height T2 brings about a greater effect to restrict contact between the first sections 31A and the target surface. The protruding elastic second layer 32 provides adequate cushioning properties to PSA tape roll 10 to reduce the rolling noise during its use. With the cushioning properties, the area of contact between the adhesive face 35 (especially the first sections 31A) and the target surface can be adjusted easily by the pressure onto the target surface. In an embodiment, the protruding height T2 can be about 50 µm or greater (e.g. about 60 µm or greater). The protruding height T2 can be, for instance, about 2 mm or less (typically about 1 mm or less). From the standpoint of the ease of forming the second layer 32 and the retention of the shape, it is usually suitably about 500 µm or less, or preferably about 150 µm. The protruding height T2 can be about 100 µm or less, or even about 85 µm or less. With decreasing protruding height T2, the thickness of the second layer 32 generally decreases as well. This can be advantageous from the standpoint of reducing formation of sticky strings (cobwebbing) of the second layer 32 while PSA tape 12 is torn off. The art disclosed herein can be favorably implemented in an embodiment where the protruding height T2 is, for instance, about 65 µm or less (or even about 50 µm or less).

In an embodiment, the protruding height T2 of the second sections 32A can be greater than the thickness T1 of the first layer 31 (i.e. T1<T2). According to such an embodiment, a PSA tape roll having favorable cushioning properties is likely to be obtained. The art disclosed herein can be preferably implemented in an embodiment where the protruding height T2 is about at least 1.5 times (typically at least 2 times, e.g. at least three times) the thickness T1. In a preferable embodiment, the protruding height T2 is up to about 10 times (typically up to 7 times, e.g. up to 5 times) the thickness T1.

The percent surface area of the second sections 32A in the combined surface area of the first and second sections 31A and 32A can be, for instance, 2% or higher, usually suitably 5% or higher, 10% or higher, 15% or higher, or even 20% or higher. The percentage can be, for instance, 70% or lower, usually suitably 50% or lower, 40% or lower, or even 30% or lower. By adjusting the percent surface area between the first and second sections 31A and 32A, the operational feeling during use can be adjusted to a favorable range. With respect to the PSA tape roll 10 in the present embodiment, the combined surface area is equal to the surface area of the adhesive face 35, and equal to the surface area of where the first layer 31 is formed as well.

While no particular limitations are imposed, the height H from the first face 20A of substrate 20 to the second sections 32A (corresponding to the combined thickness of the first and second layers 31 and 32, i.e. T1+T2 in the present embodiment) can be, for instance, 250 µm or less, usually suitably 150 µm or less, or preferably 120 µm or less (e.g. 100 µm or less). A small height H can be advantageous from the standpoint of making the PSA tape roll smaller or increasing the length of the PSA tape constituting the roll. From the standpoint of the adhesive properties such as the case of adjusting the unwinding force ratio, the height H is usually suitably 15 µm or greater, preferably 25 µm or greater, or more preferably 35 µm or greater (e.g. 45 µm or greater).

<Unwinding Force>

The PSA tape roll disclosed herein is constituted typically so that the unwinding force $F_0$ at 0° C. is up to 10 times the unwinding force $F_{30}$ at 30° C. That is, the unwinding force ratio determined by $F_0/F_{30}$ (or simply the unwinding force ratio, hereinafter) is 10 or lower. The unwinding force ratio limited at or below the prescribed value means that the temperature dependence of the unwinding force is reduced. This can favorably bring about a PSA tape roll which allows easy renewal of the adhesive face even at a low temperature while loosening of the roll is inhibited even at room temperature.

Here, the unwinding force of the PSA tape roll is determined as follows:

[Determination of Unwinding Force]

The PSA tape roll (specimen) to be measured is set in a tensile tester. At a measurement temperature of X ° C. the PSA tape roll end is clamped in the chuck of the tensile tester and pulled at a rate (unwinding speed) of 1000 mm/min to unwind the PSA tape roll in the tangential direction. The tensile strength observed during this is converted as necessary to the value per width of the adhesive face to determine the unwinding force $F_X$ at X ° C. For instance, the tensile strength can be converted to the value per 150 mm width of the adhesive face to determine the unwinding force $F_X$ in N/150 mm. When the adhesive face of the specimen has a width of 150 mm, the measurement value can be used as is (without conversion) as the unwinding force $F_X$ in N/150 mm. The same method is used in the working examples described later. At measurement temperatures of 0° C. and 30° C., unwinding forces $F_0$ and $F_{30}$ can be determined, respectively. The unwinding forces are desirably determined after PSA tape rolls to be measured are stored at the measurement temperatures for at least one hour to equilibrate to the temperatures.

In general, when the measurement environment is at a low temperature, the unwinding force of a PSA tape roll tends to increase. Thus, if the unwinding force is increased in order to inhibit rail drawing and roll-loosening at room temperature (typically about 20° C. to 30° C.), the unwinding force will be excessively high for renewing the adhesive face at a low temperature, making withdrawal of the PSA tape harder and leading to issues such as tearing and splitting of the PSA tape and poor efficiency due to attentions required for the withdrawal. On the other hand, if the unwinding force is adjusted to facilitate the renewal of the adhesive face at a low temperature, rail drawing and roll-loosening are likely to occur at room temperature. According to the art disclosed herein, by lowering the unwinding force ratio, that is, by making the unwinding force less dependent on the temperature, efficient renewal of the adhesive face can be combined with prevention of rail drawing and roll-loosening.

In the art disclosed herein, the unwinding force ratio of the PSA tape roll (i.e. $F_0/F_{30}$) is preferably about 8 or lower, more preferably about 6 or lower, or even about 4 or lower (e.g. about 3 or lower). When the unwinding force ratio decreases (i.e. when the unwinding force becomes less dependent on the temperature), efficient renewal of the adhesive face and prevention of rail drawing and roll-loosening can be combined at a high level. The unwinding force ratio is usually about 1 or higher. When it is far below 1, issues such as anchoring failure may arise in measurement at a low temperature. With respect to the PSA tape roll disclosed herein, better results tend to be obtained as the unwinding force ratio approaches 1, but not below 1. On the other hand, from a practical viewpoint, the PSA tape roll disclosed herein can also be favorably made in an embodiment where the unwinding force ratio is higher than 1 (e.g. about 1.2 or higher, or even about 1.5 or higher). The unwinding force ratio can be adjusted by selection of the material forming the adhesive face, the structure of the adhesive face (e.g. the thicknesses of the first and second layers; shapes, dimensions and arrangement of the first and second sections; etc.), selection of the material forming the backside of the PSA tape, etc.

The unwinding force $F_{30}$ of the PSA tape roll at 30° C. is not particularly limited. In an embodiment, when the unwinding force $F_{30}$ is about 0.3 N/150 mm or greater, roll-loosening can be significantly inhibited. When the unwinding force $F_{30}$ is about 0.5 N/150 mm or higher (e.g. about 0.7 N/150 mm or higher), greater effects can be obtained. On the other hand, from the standpoint of the ease of intentionally withdrawing the PSA tape from the PSA tape roll for renewing the adhesive face, etc., and of preventing the adhesive face-forming material from transferring (moving and sticking) to the backside of the PSA tape, the unwinding force $F_{30}$ is usually suitably about 5 N/150 mm or less (typically about 3 N/150 mm or less. e.g. about 2 Nil 50 mm or less), or even about 1.5 N/150 mm or less (e.g. about 1.0 N/150 mm or less).

The unwinding force $F_0$ of the PSA tape roll at 0° C. is not particularly limited. It is usually suitably about 7 Ni 150 mm or less, preferably about 6.0 N/150 mm or less, more preferably about 5.0 N/150 mm or less, or possible about 4.0 N/150 mm or less (e.g. about 3.0 N/150 mm or less). A small unwinding force $F_0$ tends to facilitate withdrawal of the PSA tape from the PSA tape roll even at a low temperature. On the other hand, from the standpoint of inhibiting rail drawing and roll-loosening, the unwinding force $F_0$ is usually suitably about 0.5 N/150 mm or greater, or preferably about 1 N/150 mm or greater (e.g. about 1.5 N/150 mm or greater). The respective unwinding forces at 0° C. and 30° C. can be adjusted by selection of the material forming the adhesive face, the structure of the adhesive face, selection of the material forming the backside of the PSA tape, etc.

<Substrate>

As the substrate of the PSA tape roll, various types of resin film, paper, fabric, rubber sheet, foam sheet, metal foil, a composite of these and the like can be used. Examples of the resin film material include polyolefins (polyethylene (PE), polypropylene (PP), ethylene-propylene copolymer, etc.), polyesters (polyethylene terephthalate (PET), etc.), vinyl chloride resin, vinyl acetate resin, polyimide resin, polyamide resin, fluororesin, thermoplastic elastomer (TPE) (e.g. an olefinic thermoplastic elastomer) and acrylic resin. As the acrylic resin, either one can be used between a species synthesized using an acryloyl group-containing monomer in a larger amount (typically in a larger amount (by weight) than a methacryloyl group-containing monomer) and a species synthesized using a methacryloyl group-containing monomer in a larger amount (typically in a larger amount (by weight) than an acryloyl group-containing monomer). The concept of acrylic resin here may encompass species generally called acrylic rubber. Examples of paper include Japanese paper (washi), kraft paper, glassine paper, high-grade paper, synthetic paper, and top-coated paper. Examples of fabric include woven fabric and non-woven fabric of a single species or a blend of various fibrous substances. Examples of fibrous substances include cotton, staple fiber, Manila hemp, pulp, rayon, acetate fiber, polyester fiber, polyvinyl alcohol fiber, polyamide fiber, and polyolefin fiber. Examples of rubber sheets include natural rubber sheet, and butyl rubber sheet. Examples of foam sheets include resin foam sheets such as polyolefin foam sheet (PE foam sheet, PP foam sheet, etc.), polyurethane foam sheet, and polychloroprene rubber foam sheet. Examples of metal foil include aluminum foil and copper foil. As used herein, the resin film typically refers to non-porous film: it is different from a foam sheet and is also conceptually distinguished from so-called non-woven fabric and woven fabric. To the material mixture forming the substrate, as necessary various additives may be added, such as filler (inorganic filler, organic filler, etc.), anti-aging agent, antioxidant, UV ray absorber, photostabilizer antistatic agent, lubricant, plasticizer, colorant (pigment, dye, etc.).

The substrate may have a monolayer structure or a multilayer structure in which two or more layers are laminated. Preferable examples include a paper substrate having a release layer formed with a release agent on the backside, a paper substrate laminated with resin film on the backside, a paper substrate coated on the backside with a resin material by hot melt extrusion, a monolayer or multilayer resin film, and a monolayer or multilayer resin foam sheet. In an embodiment, a substrate of which at least the second face is formed from a resin material (preferably a polyolefin resin, e.g. PE resin) can be used.

The first face (the face supporting the first and second layers while facing the outside of the PSA tape roll) may be subjected to a surface treatment to enhance anchoring to the first face, such as corona discharge treatment and primer coating. Alternatively, a substrate whose first face has not been subjected to a surface treatment can be used as well. With a substrate whose first face is made of paper or fabric, good anchoring is likely to be obtained without requiring the surface treatment. This can be advantageous in view of reducing the cost, increasing the productivity, etc.

The substrate's second face (the face opposing the adhesive face while facing the inside of the PSA tape roll) may be subjected to a surface treatment such as coating of a release agent so as to adjust the unwinding force of the PSA tape roll to a suitable range. In a preferable embodiment, a paper substrate whose second face (possibly a face treated with known sealer) has been treated with a release agent, a paper substrate whose second face is laminated with resin film and treated with a release agent, and the like can be used. The release agent used in the release treatment is not particularly limited. For instance, a silicone-based release agent, fluorine-based release agent, a long-chain alkyl-based release agent, and other known or commonly-used release agents can be used in accordance with the purpose and application. For the release agent, solely one species or a combination of two or more species can be used. In another preferable embodiment, a substrate whose second face has not been subjected to the surface treatment can be used. For instance, by using a substrate whose second face is formed from a low-polar resin material (e.g. a polyolefin resin such as PE resin) and suitably selecting the viscoelastic material forming the second layer, a PSA tape roll that exhibits a suitable unwinding force without requiring the surface treatment (release treatment, etc.) can be favorably obtained.

In this embodiment, as shown in FIG. 2, a substrate 20 is used, having a multilayer structure in which a support layer 202 and a backside layer 204 are laminated. Support layer 202 is made of paper (high-grade paper here) and laminated with PE resin film on its second face side, with the PE resin film forming the backside layer 204. The second face 20B (the surface of the backside layer 204) of substrate 20 is not treated with a release agent.

In the art disclosed herein, the thickness of the substrate can be suitably selected in accordance with the purpose, and is not particularly limited. In an embodiment, the thickness of the substrate can be, for instance, 200 µm or less, 150 µm or less, or even 100 µm or less (e.g. 80 µm or less). A smaller thickness of the substrate can be advantageous from the standpoint of inhibiting roll-loosening. The thickness of the substrate can be, for instance, 10 µm or greater, typically 25 µm or greater, preferably 40 µm or greater, or even 50 µm or greater. With increasing thickness of the substrate, the strength of the substrate tends to generally increase. Thus, a larger thickness of the substrate can be advantageous from the standpoint of preventing tearing and splitting while the PSA tape is withdrawn from the roll. For instance, such a thickness can be preferable for substrates made of resin film, non-woven fabric and paper. For instance, in an embodiment using a monolayer or multilayer substrate that includes a foam sheet, the thickness of the substrate is usually suitably 150 µm or greater (typically 300 µm or greater, preferably 500 µm or greater, e.g. 700 µm or greater), it is suitably 3 mm or less (typically 2 mm or less, preferably 1.5 mm or less, e.g. 1.2 mm or less).

The width of the substrate (the width of the PSA tape) can be suitably selected in accordance with the purpose, and is not particularly limited. From the standpoint of the ease of using the PSA tape roll, the width of the substrate is usually suitably 1 cm or greater, preferably 3 cm or greater, 5 cm or greater, or even 10 cm or greater. A larger width of the substrate tents to hinder withdrawal of PSA tape from the PSA tape roll and tends to cause roll-loosening as well. Accordingly, it is significant to apply the art disclosed herein to facilitate the unwinding operation while inhibiting roll-loosening. From such a standpoint, the art disclosed herein can be preferably implemented in an embodiment where the substrate has a width of, for instance, about 12 cm or greater (typically about 14 cm or greater). The width of the substrate can be, for instance, about 100 cm or less, typically about 70 cm or less, preferably about 50 cm or less, about 40 cm or less, about 35 cm or less, or even about 30 cm or less (e.g. about 25 cm or less). The art disclosed herein can be preferably implemented in an embodiment where the substrate has a width of, for instance, about 10 cm or greater and about 50 cm or less (preferably about 14 cm or greater and about 40 cm or less).

The width of the adhesive face formed on the first face of the substrate is usually suitably about 0.8 cm or greater, preferably about 2.5 cm or greater, about 4.5 cm or greater, or even about 9.5 cm or greater. With increasing width of the adhesive face, tearing and splitting tend to be likely to occur when withdrawing the PSA tape from the PSA tape roll. Accordingly, it is significant to apply the art disclosed herein to facilitate unwinding and inhibit roll-loosening at the same time. From such a standpoint, the art disclosed herein can be preferably implemented in an embodiment where the adhesive face has a width of, for instance, about 11 cm or greater (typically about 13 cm or greater). The width of the adhesive face can be, for instance, about 98 cm or less, typically 68 cm or less, preferably about 48 cm or less, about 39 cm or less, about 34.5 cm or less, or even about 29.5 cm or less (e.g. about 24.5 cm or less). The art disclosed herein can be preferably implemented in an embodiment where the adhesive face has a width of, for instance, about 9.5 cm or greater and about 48 cm or less (preferably about 13 cm or greater and 39 cm or less).

While no particular limitations are imposed, the cylindrical PSA tape roll may have a diameter of usually about 10 mm or greater (typically 30 mm or greater, e.g. 40 mm or greater). Here, the diameter of the PSA tape roll refers to the diameter (outer diameter) of the unused PSA tape roll. The diameter of the PSA tape roll is usually about 200 mm or less (typically about 150 mm or less, preferably about 100 mm or less), or even about 80 mm or less. The PSA tape forming the cylindrical PSA tape roll may have an inner diameter of usually about 8 mm or greater (typically 25 mm or greater, e.g. 35 mm or greater). Here, the inner diameter of the PSA tape refers to the winding diameter of the PSA tape at the beginning of its winding; in a PSA tape roll with the PSA tape wound on a core, it is generally equal to the outer diameter of the core. The inner diameter of the PSA tape is usually about 190 mm or less (typically about 140 mm or less, preferably about 95 mm or less), or it can also be about 75 mm or less. In the PSA tape roll, the thickness of wound layers of the PSA tape (typically equivalent to one half the difference between the diameter of the PSA tape roll and the inner diameter of the PSA tape) is typically 1 mm or greater, preferably about 2.5 mm or greater, or more preferably about 5 mm or greater (e.g. about 7 mm or greater). From the standpoint of reducing the difference in operational feeling of the PSA tape roll between start to end of its use, the thickness of wound layers is usually suitably about 50 mm or less, preferably about 30 mm or less, more preferably about 20 mm or less, or possibly about 15 mm or less (e.g. about 12 mm or less). The width of the cylindrical PSA tape roll (the length in the direction of the winding axis) is normally about the same as the width of the substrate. The art disclosed herein can be preferably made in these dimensions.

<First Layer>

Examples of the PSA forming the first layer include acrylic PSA, rubber-based PSA, polyester-based PSA, urethane-based PSA, polyether-based PSA and silicone-based PSA. Here, the rubber-based PSA refers to a PSA that comprises a rubber-based polymer as its base polymer. The same applies to the other PSAs.

As used herein, the base polymer refers to the primary component (a component with the highest percentage) among polymers. In the polymer content of the PSA disclosed herein, the base polymer content is typically about 50% by weight or higher, usually suitably about 70% by weight or higher, or even about 90% by weight or higher based on non-volatiles. The base polymer content is 100% by weight at maximum. For instance, it can be about 99% by weight or lower. From the standpoint of the adhesive properties and the cost, a rubber-based PSA or an acrylic PSA can be preferably used.

As the acrylic PSA, a PSA comprising an acrylic polymer as the base polymer is used. Here, the acrylic polymer refers to a polymer whose primary monomer (the primary component among monomers forming the acrylic polymer, i.e. a component accounting for 50% by weight or more of the total monomer content) is a monomer having at least one (meth)acryloyl group per molecule (which may be referred to as an acrylic monomer, hereinafter). The acrylic monomer may account for 70% or more (e.g. 90% or more) by weight of the monomers forming the acrylic polymer. As used herein, the (meth)acryloyl group comprehensively refers to acryloyl group and methacryloyl group. Similarly, the (meth)acrylate here comprehensively refers to acrylate and methacrylate.

Examples of the rubber-based PSA include a PSA that comprises, as the base polymer, one, two or more species among rubber-based polymers such as natural rubber-based polymers including natural rubber and modified products thereof, isoprene rubber, chloroprene rubber, styrene-isoprene-styrene block copolymer (SIS), styrene-butadiene-styrene block copolymer (SBS), styrene-ethylene/butylene-styrene block copolymer (SEBS), crystalline polyolefin-ethylenebutylene-crystalline polyolefin block copolymer (CEBC), and styrene-ethylene/butylene-crystalline polyolefin block copolymer (SEBC).

A favorable example of the rubber-based PSA is a PSA (SIS-based PSA) comprising SIS as the base polymer. In this embodiment, the first layer 31 is formed of an SIS-based PSA. In addition to the SIS as the base polymer, the SIS-based PSA may comprise, for instance, a tackifier resin (tackifier) and process oil as major components. The respective species of components and their ratio can be selected in accordance with the application of the PSA tape roll so as to obtain desirable adhesive properties.

As the tackifier resin, solely one species or a suitable combination of two or more species can be used among various species of tackifier resin such as general rosin-based, terpene-based, hydrocarbon-based, epoxy-based, polyamide-based, elastomer-based, phenol-based, and ketone-based species. While no particular limitations are imposed, the amount of the tackifier resin used to 100 parts by weight of the base polymer can be, for instance, about 50 parts to 200 parts by weight: it is usually suitably about 80 parts to 150 parts by weight.

As the process oil, for instance, solely one species or a suitable combination of two or more species can be used such as general paraffin-based, naphthenic and aromatic process oils. While no particular limitations are imposed, the amount of the process oil used to 100 parts by weight of the base polymer can be, for instance, about 50 parts to 200 parts by weight; it is usually suitably about 90 parts to 150 parts by weight.

To the PSA (e.g. an SIS-based PSA) forming the first layer, various additives can be further added, such as anti-aging agent, antioxidant, UV absorber, photostabilizer, antistatic agent, lubricant and colorant (pigment, dye, etc.). The species of additives and their amounts added can be the same as for typical species and amounts added in the field of general PSA.

The PSA forming the first layer can be various types of PSA such as a hot melt type with which adhesive components are heated and melted to form a PSA layer, a water dispersion type (typically an emulsion type) in which adhesive components are dispersed in water, and a solvent type in which adhesive components are dissolved in an organic solvent. From the standpoint of the productivity and reduction of environmental burden, a hot melt PSA can be preferably used.

<Second Layer>

In this embodiment, as the viscoelastic material forming the second layer, an acrylic viscoelastic material can be used. The acrylic viscoelastic material refers to a viscoelastic material that comprises an acrylic polymer as the base polymer, that is, a viscoelastic material in which an acrylic polymer is the component with the highest percentage among the polymers therein. Of the polymer content in the viscoelastic material disclosed herein, the base polymer content (based on non-volatiles) is typically about 50% by weight or higher, usually suitably about 70% by weight or higher, or possibly about 90% by weight or higher. The base polymer content is 100% by weight at maximum. For instance, it can be about 99% by weight or lower.

In the art disclosed herein, the viscoelastic material forming the second layer can be a material that exhibits pressure-sensitive adhesiveness at room temperature (e.g. around 25° C.) (i.e. a PSA) or can be a material that does not substantially exhibit pressure-sensitive adhesiveness (i.e. a non-PSA). The composition of the first layer-forming PSA (first PSA) and the composition of the second layer-forming viscoelastic material can be the same or different. In an embodiment of the art disclosed herein, as the viscoelastic material forming the second layer, a viscoelastic material (possibly a PSA) having a composition different from that of the first PSA can be preferably used. The viscoelastic material forming the second layer may have, for instance, a composition obtained by adding an additional component (e.g. a filler) to the first PSA, or a composition obtained by increasing or decreasing the amounts of some components (e.g. tackifier) in the first PSA. Alternatively, the base polymer species of the first PSA can be a different species (e.g. a rubber-based polymer) from the base polymer of the viscoelastic material forming the second layer. In a preferable embodiment, the viscoelastic material forming the second layer may be an acrylic PSA that is less adhesive as compared to the first PSA, or may be an acrylic non-PSA viscoelastic material.

With respect to the acrylic polymer as the base polymer of the acrylic viscoelastic material (preferably an acrylic PSA), when the monomers forming the polymer comprises two or more species of monomer, the acrylic polymer can be a random copolymer, a block copolymer, a graft copolymer, etc. From the standpoint of the ease of production and the handling properties, preferable acrylic polymers include a random copolymer and a block copolymer. For the acrylic polymer, solely one species or a combination of two or more species can be used.

(Acrylic Random Copolymer)

Examples of preferable acrylic polymer include an acrylic random copolymer derived from a starting monomer mixture that comprises an alkyl (meth)acrylate having an alkyl group as the primary monomer. As the alkyl (meth)acrylate, for instance, a compound represented by a general formula (1) shown below can be preferably used:

$$CH_2=CR^1COOR^2 \qquad (1)$$

Here, $R^1$ in the general formula (1) is a hydrogen atom or a methyl group. $R^2$ is an acyclic alkyl group having 1 to 20 carbon atoms (hereinafter, such a range of the number of carbon atoms may be indicated as "$C_{1-20}$"). From the standpoint of the storage elastic modulus of the acrylic viscoelastic material, etc., an alkyl (meth)acrylate with $R^2$ being a $C_{1-12}$ (e.g. $C_{2-10}$, typically $C_{4-8}$) acyclic alkyl group is preferable. These alkyl (meth)acrylates can be used singly as one species or in a combination of two or more species. Preferable alkyl (meth)acrylates include n-butyl (meth)acrylate, 2-ethylhexyl (meth)acrylate, isooctyl (meth)acrylate, isononyl (meth)acrylate, and lauryl (meth)acrylate. It is particularly preferable to use either one or each of n-butyl acrylate (BA) and 2-ethylhexyl acrylate (2EHA).

The ratio of the primary monomer in all the monomers forming the acrylic random copolymer is preferably about 60% by weight or higher, more preferably about 80% by weight or higher, or yet more preferably about 90% by weight or higher. The maximum ratio of the primary monomer in all the monomers is not particularly limited. From the standpoint of easy adjustment of the properties (adhesive strength, cohesive strength, etc.) of the acrylic viscoelastic material, it is usually preferably about 99% by weight or less (e.g. about 98% by weight or less, typically about 95% by weight or less). The acrylic random copolymer can be a polymerization product of the starting monomer mixture comprising essentially of the primary monomer.

For adjusting the properties of the acrylic viscoelastic material, etc., the starting monomer mixture used in polymerization of the acrylic random copolymer may further comprise, in addition to the primary monomer, a secondary monomer copolymerizable with the primary monomer. A favorable example of such a secondary monomer is a monomer having a functional group (or a "functional group-containing monomer" hereinafter). The functional group-containing monomer can be added to incorporate crosslinking points into the acrylic polymer to facilitate adjustment of the properties (adhesive strength, cohesive strength, etc.) of the acrylic viscoelastic material. Examples of the functional group-containing monomer include a carboxy-group-containing monomer, an acid-anhydride-group-containing monomer, a hydroxy-group-containing monomer, an amide-group-containing monomer, an amino-group-containing monomer, an epoxy-group (glycidyl group)-containing monomers, an alkoxy-group-containing monomer, and an alkoxysilyl-group-containing monomer. These can be used singly as one species or in a combination of two or more species. For easy incorporation of crosslinking points into the acrylic polymer or for easy adjustment of the crosslink density of the acrylic viscoelastic material, it is preferable to use a functional group-containing monomer having at least a carboxy group, a hydroxy group or an epoxy group. Particularly preferable functional group-containing monomers include a carboxy group-containing monomer and a hydroxy group-containing monomer. Favorable examples of the carboxy group-containing monomer include acrylic acid and methacrylic acid. Favorable examples of the hydroxy group-containing monomer include 2-hydroxyethyl acrylate and 4-hydroxybutyl acrylate.

When a functional group-containing monomer as described above is used, the amount of the functional group-containing monomer (preferably a carboxyl group-containing monomer) accounts for preferably about 1% to 10% by weight (e.g. about 2% to 8% by weight, typically about 3% to 7% by weight) of all the monomers.

For instance, to increase the cohesive strength of the acrylic polymer, etc., the starting monomer mixture may comprise, as the secondary monomer, other monomer(s) that is not the functional-group-containing monomer. Examples of the other monomer(s) include vinyl-ester-based monomers such as vinyl acetate, and vinyl propionate; and aromatic vinyl compounds such as styrene, substituted styrenes (α-methyl styrene, etc.), and vinyl toluene; cycloalkyl (meth)acrylates such as cyclohexyl (meth)acrylate and isobornyl (meth)acrylate; aromatic ring-containing (meth) acrylates such as aryl (meth)acrylates (e.g. phenyl (meth) acrylate), aryloxyalkyl (meth)acrylates (e.g. phenoxyethyl (meth)acrylate), and arylalkyl (meth)acrylates (e.g. benzyl (meth)acrylate); olefinic monomers such as ethylene, propylene, isoprene, butadiene, and isobutylene; chlorine-containing monomers such as vinyl chloride and vinylidene chloride; vinyl ether-based monomers such as methyl vinyl ether and ethyl vinyl ether. These can be used singly as one species or in a combination of two or more species. The amount of secondary monomers other than the functional group-containing monomer can be suitably selected in accordance with the purpose and application, and is not particularly limited. For instance, it is preferably about 20% or less (e.g. about 2% to 20%, typically about 3% to 10%) by weight of all the monomers for synthesizing the acrylic polymer.

The method for synthesizing the acrylic polymer (acrylic random copolymer) from the monomer mixture is not particularly limited. A general polymerization method can be suitably employed, such as heretofore known solution polymerization, emulsion polymerization, bulk polymerization, and suspension polymerization. The embodiment of the polymerization is not particularly limited. It can be carried out with suitable selection of a heretofore known monomer supply method, polymerization conditions (temperature, time, pressure, etc.), and other components (polymerization initiator, surfactant, etc.) used besides the monomer(s).

The polymerization initiator is not particularly limited. Examples include an azo-based initiator such as 2,2'-azobisisobutylonitrile: a peroxide-based initiator such as benzoyl peroxide; a substituted ethane-based initiator such as phenyl-substituted ethane; and a redox initiator system by a combination of a peroxide and a reducing agent (e.g. a combination of a peroxide and sodium ascorbate). The amount of polymerization initiator used can be suitably selected in accordance with the species of polymerization initiator, the monomer species (the composition of the monomer mixture) and so on. It is usually suitably selected from a range of, for instance, about 0.005 part to 1 part by weight to 100 parts by weight of all the monomers. The polymerization temperature can be, for example, around 20° C. to 100° C. (typically 40° C. to 80° C.).

The weight average molecular weight (Mw) of the acrylic random copolymer is not particularly limited. For instance, an acrylic random copolymer with Mw of about $30 \times 10^4$ to $100 \times 10^4$ can be favorably used as the base polymer. In a preferable embodiment, the second layer can be an acrylic viscoelastic layer formed from a solvent-based composition that comprises, as the base polymer, an acrylic random copolymer with Mw in this range.

(Acrylic Block Copolymer)

The acrylic polymer according to another preferable embodiment is an acrylic block copolymer. The acrylic block copolymer typically has at least one hard segment A (or an "A block" hereinafter) and at least one soft segment B (or a "B block" hereinafter) in one molecule. In the structure of the acrylic block copolymer, the hard segment A refers to the relatively hard block in relation to the soft segment B in the acrylic copolymer. The soft segment B refers to the relatively soft block in relation to the hard segment A in the structure of the acrylic block copolymer.

The acrylic block copolymer may exhibit characteristics of thermoplastic polymers (typically thermoplastic elastomers). The acrylic viscoelastic material disclosed herein comprises the acrylic block copolymer as the base polymer and thus may be a viscoelastic material suited for hot melt application (i.e. a hot melt viscoelastic material). From the standpoint of the productivity and reduction of environmental burden, it is preferable to use a hot melt viscoelastic material to form the second layer.

Here, the acrylic block copolymer refers to a block copolymer comprising a monomer unit derived from an acrylic monomer. For instance, in a preferable acrylic block copolymer, a monomer unit derived from an acrylic monomer accounts for 50% by weight or more of the total monomer units. Such an acrylic block copolymer can be preferably derived from a starting monomer mixture comprising, as the primary monomer, an alkyl (meth)acrylate having an alkyl group.

A preferable acrylic block copolymer comprises at least one acrylate block (which hereinafter may be referred to as an Ac block) and at least one methacrylate block (which hereinafter may be referred to as an MAc block) in one molecule. For instance, a preferable block copolymer has a structure in which Ac blocks and MAc blocks are positioned alternately. The total block number of Ac blocks and MAc blocks comprised in one polymer molecule can be about 2.5 to 5 (e.g. about 2.7 to 3.3, typically about 3) in average.

In an embodiment of the Ac block, alkyl acrylate-derived monomer units preferably account for about 50% by weight or more of all the monomer units forming the Ac block. Alkyl acrylate-derived monomer units may account for about 75% by weight or more (e.g. about 90% by weight or more) as well. In a preferable embodiment, the Ac block in the acrylic block copolymer is a polymer essentially formed of one, two or more species (typically one species) of alkyl acrylate. Alternatively, the Ac block may be a copolymer of an alkyl acrylate and other monomer (e.g. an alkyl methacrylate, etc.).

An example of the Ac block-forming alkyl acrylate is an alkyl acrylate whose alkyl group has 1 to 20 carbon atoms (i.e. a $C_{1-20}$ alkyl acrylate). Examples of the $C_{1-20}$ alkyl acrylate include methyl acrylate, ethyl acrylate, n-propyl acrylate, isopropyl acrylate, n-butyl acrylate (BA), isobutyl acrylate, tert-butyl acrylate, n-pentyl acrylate, n-hexyl acrylate, n-heptyl acrylate, n-octyl acrylate, isooctyl acrylate (IOA), 2-ethylhexyl acrylate (2EHA), n-nonyl acrylate, isononyl acrylate (INA), decyl acrylate, lauryl acrylate, stearyl acrylate, etc. These can be used singly as one species or in a combination of two or more species. A preferable Ac block comprises a $C_{4-14}$ alkyl acrylate as the monomer unit. A more preferable Ac block comprises a $C_{4-9}$ alkyl acrylate (e.g. at least BA or 2EHA) as the monomer unit. The Ac block may comprise a $C_{6-9}$ alkyl acrylate as the monomer unit.

In a preferable embodiment, 50% by weight or more of monomers constituting the Ac block is an alkyl acrylate having 4 to 14 carbon atoms in its alkyl group. The ratio of alkyl acrylate having 4 to 14 carbon atoms in alkyl group can be 75% by weight or greater or can be essentially 100% by weight (e.g. greater than 99% by weight, but 100% by weight or less). For instance, it is preferable to use a structure in which the monomer unit(s) constituting the Ac block essentially consist of BA or 2EHA, or comprise the two species, BA and 2EHA, and so on.

In an embodiment where the Ac block-constituting monomer units comprise both BA and 2EHA, the weight ratio of BA to 2EHA is not particularly limited. In the monomer units, the BA/2EHA weight ratio can be, for instance, 10/90 to 90/10, preferably 80/20 to 20/80, more preferably 30/70 to 70/30, or even 60/40 to 40/60.

In an embodiment of the MAc block alkyl methacrylate-derived monomer units preferably account for about 50% by weight or more of all the monomer units constituting the MAc block. Alkyl methacrylate-derived monomer units may account for about 75% by weight or more (e.g. about 90% by weight or more) as well. In a preferable embodiment, the MAc block in the acrylic block copolymer is a polymer essentially formed of one, two or more species (typically one species) of alkyl methacrylate. Alternatively, the MAc block may be a copolymer of an alkyl methacrylate and other monomer(s) (e.g. an alkyl acrylate, etc.).

The alkyl methacrylate constituting the MAc block may be an alkyl methacrylate whose alkyl group has 1 to 20 (preferably 1 to 14) carbon atoms. Specific examples thereof include methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, isooctyl methacrylate, 2-ethylhexyl methacrylate, n-nonyl methacrylate, isononyl methacrylate, decyl methacrylate, lauryl methacrylate, stearyl methacrylate, etc. These can be used singly as one species or in a combination of two or more species.

In a preferable embodiment, about 50% by weight or more of the monomers constituting the MAc block is an alkyl methacrylate having an alkyl group with 1 to 4 (preferably 1 to 3) carbon atoms. The ratio of the alkyl methacrylate having 1 to 4 carbon atoms in its alkyl group can be about 75% by weight or greater, or essentially 100% by weight (e.g. greater than 99% by weight, but 100% by weight or less). Especially preferable alkyl methacrylates include methyl methacrylate (MMA) and ethyl methacrylate (EMA). For example, the monomers preferably employed may consist essentially of MMA alone, EMA alone, both MMA and EMA, or the like.

The acrylic block copolymer may be a copolymer comprising A blocks (hard segments A) and B blocks (soft segments B) placed alternately, with the A block having been formed of a polymer having a rigid structure with excellent cohesive strength and elasticity, and the B block having been formed of a polymer having a flexible structure with excellent viscosity. With a viscoelastic material comprising as its base polymer an acrylic block copolymer having such a structure, the second layer may be formed with cohesive strength, elasticity, and viscosity combined at a high level. A viscoelastic material having such a composition can be preferably used as a hot melt viscoelastic material. In the hot melt viscoelastic material, an acrylic block copolymer having a structure with an A block at each terminus can be preferably used. An acrylic block copolymer having such a structure is likely to exhibit well-balanced cohesion and thermoplasticity. From the standpoint of reducing the melt viscosity, etc., an acrylic block copolymer having a linear structure is advantageous as compared to a species having a stellar structure or a branched structure.

When the acrylic block copolymer comprises two or more A blocks, the compositions, molecular weights (polymerization degrees), structures, etc., of these A blocks can be the same with or different from each other. When the acrylic block copolymer comprises two or more B blocks, the same applies to the B blocks.

As the A block, a MAc block as those described above can be preferably used. As the B block, an Ac block as those described above can be preferably used. In a preferable embodiment, the acrylic block copolymer is a triblock copolymer having a structure of MAc-Ac-MAc (ABA structure). For instance, can be preferably used a triblock copolymer with two MAc blocks having essentially identical monomer compositions.

In an embodiment, a preferable acrylic block copolymer has a soft segment B that comprises a monomer unit derived from a $C_9$ alkyl acrylate. Specific examples of the $C_{6-9}$ alkyl acrylate include 2EHA, n-octyl acrylate, n-nonyl acrylate, INA, and IOA. With respect to such an alkyl acrylate, its homopolymer generally has a low glass transition temperature (Tg). Thus, when it is used as a monomer forming an Ac block, it enhances the low-temperature properties of an acrylic block copolymer having the Ac block and may further enhance the low-temperature properties (e.g. the flexibility at a low temperature) of a viscoelastic material (the second layer) comprising the acrylic block copolymer as the base polymer. This may result in a smaller increase in unwinding force at a low temperature, reducing the unwinding force ratio ($F_0/F_{30}$). These effects can be greater with a $C_{6-9}$ alkyl acrylate whose homopolymer has a Tg of lower than −55° C. (more preferably about −60° C. or lower, e.g. about −65° C. or lower). The $C_{6-9}$ alkyl acrylates exemplified above have the following Tg values: 2EHA-70° C., n-octyl acrylate-65° C., n-nonyl acrylate-60° C. INA-58° C., and IOA-58° C.

Of the monomer units forming the Ac block, the amount of the $C_{6-9}$ alkyl acrylate can be, for instance, about 10% by weight or greater. It is preferably about 20% or greater, more preferably about 30% or greater, or yet more preferably about 40% or greater, by weight. The monomer units forming the Ac block may consist of one, two or more species of $C_{6-9}$ alkyl acrylate. From the standpoint of the cohesion of the acrylic viscoelastic material, etc., the $C_{6-9}$ alkyl acrylate can be used in an amount of about 90% by weight or less, about 75% by weight or less, or even about 60% by weight or less of the monomer units forming the Ac block.

In an embodiment, it is possible to use an acrylic block copolymer that has, as the soft segment B, an Ac block formed with monomer units that comprise an alkyl acrylate whose alkyl group has 6 or more (e.g. 6 to 12, typically 6 to 9) carbon atoms and an alkyl acrylate whose alkyl group has 2 to 5 (e.g. 3 to 4, typically 4) carbon atoms at a weight ratio of 20/80 to 80/20 (more preferably 30/70 to 70/30, or yet more preferably 40/60 to 60/40, e.g. 45/55 to 55/45). Such an acrylic block copolymer may have well-balanced low-temperature properties and cohesiveness. For instance, it is preferable to use an acrylic block copolymer that has, as the soft segment B, an Ac block formed with monomer units that comprise 2EHA and BA at an aforementioned weight ratio. The Ac block may be formed solely from 2EHA and BA.

The weight ratio of hard segment A to soft segment B is not particularly limited in the acrylic block copolymer. The weight ratio (A/B) of hard segment A to soft segment B can be in a range of, for instance, 4/96 to 90/10, or it is usually suitably in a range of 7/93 to 70/30 or preferably in a range of 10/90 to 50/50 (e.g. more preferably 15/85 to 40/60, e.g. 15/85 to 25/75). In the acrylic block copolymer comprising two or more hard segments A, the ratio of total weight of these hard segments A to weight of soft segment B is preferably in these ranges. The same applies to the acrylic block copolymer comprising two or more soft segments B. A high ratio of hard segments A (e.g. MAc blocks) is likely to decrease the flexibility at a low temperature, increasing the unwinding force at a low temperature (e.g. 0° C.); and the unwinding force tends to show higher temperature-dependence. A high ratio of soft segments B (e.g. Ac blocks) tends to lower the cohesion of the acrylic viscoelastic material.

In a preferable example of the acrylic block copolymer disclosed herein, the starting monomers corresponding to all the monomer units constituting the acrylic block copolymer comprise an alkyl (meth)acrylate $m_X$ having 1 to 3 carbon atoms in its alkyl group and an alkyl (meth)acrylate $m_Y$ having 6 or more (e.g. 6 to 12) carbon atoms in its alkyl group. The weight ratio $m_X/m_Y$ can be, for instance, 4/96 to 90/10. An acrylic block copolymer with the weight ratio being 7/93 to 70/30 is preferable, a species with 10/90 to 50/50 is more preferable, a species with 15/85 to 40/60 is yet more preferable, and a species with 15/85 to 30/70 (e.g. 15/85 to 25/75) is particularly preferable. A high ratio of $m_X$ tends to reduce the unwinding force and facilitate withdrawal (unwinding) of the PSA tape from the PSA tape roll. As the $m_X$, an alkyl methacrylate whose alkyl group has one to three carbon atoms is preferable. For instance, MMA is preferable. When the ratio of $m_Y$ is high, roll-loosening is likely to be inhibited. As the $m_Y$, an alkyl acrylate whose alkyl group has at least six (e.g. 6 to 12, preferably 6 to 9) carbon atoms is preferable. For instance, 2EHA is preferable.

The composition of monomer units constituting an acrylic block copolymer can be determined based on the results of NMR analysis. In particular, the NMR analysis can be carried out, using, for instance, AVAVCEIII-600 (with Cryo Probe) available from Bruker Biospin as the NMR system, under the conditions shown below. For instance, the weight ratio of MMA to 2EHA in the starting monomers can be determined based on the ratio of integrated intensities of peaks at 4.0 ppm (2EHA1) and 3.6 ppm (MMA1) in the $^1$H NMR spectrum.

[NMR Analysis Conditions]
Measurement frequency: $^1$H; 600 MHz
Flip angle: 30°
Measurement solvent: $CDCl_3$
Measurement temperature: 300 K
Standard chemical shift: measurement solvent ($CDCl_3$, $^1$H: 7.25 ppm)

The acrylic block copolymer's Mw is not particularly limited. For instance, an acrylic block copolymer having a Mw of about $3 \times 10^4$ to $30 \times 10^4$ can be preferably used. Usually, the acrylic block copolymer has a Mw in a range of preferably about $3.5 \times 10^4$ to $25 \times 10^4$ or more preferably in a range of about $4 \times 10^4$ to $20 \times 10^4$ (e.g., $4.5 \times 10^4$ to $15 \times 10^4$). A high Mw of the acrylic block copolymer is advantageous from the standpoint of increasing the cohesion of the acrylic viscoelastic material and increasing the ability to collect dust on the target surface. On the other hand, a low Mw of the acrylic block copolymer is advantageous from the standpoint of decreasing the melt viscosity or the solution viscosity. It is particularly significant to decrease the melt viscosity of the acrylic viscoelastic material in an embodiment where the second layer is formed by hot melt coating of the viscoelastic material.

The Mw of an acrylic block copolymer herein refers to the value based on standard polystyrene that is determined by gel permeation chromatography (GPC) with respect to a sample prepared by dissolving the copolymer in tetrahydrofuran (THF). In particular, the GPC measurement can be performed, using, for instance, trade name "HLC-8120GPC" available from Tosoh Corporation as the GPC measurement system, under the conditions shown below. The Mw values of the other polymer and oligomer described later can be determined in the same manner.

[GPC Measurement Conditions]
Columns: available from Tosoh Corporation, TSK gel Super HZM-H/HZ4000/HZ3000/HZ2000
Column size: 6.0 mm I.D.×150 mm each
Eluent: THF
Flow rate: 0.6 mL/min
Detector: differential refractometer (RI)
Column temperature (measurement temperature): 40° C.
Sample concentration: about 2.0 g/L (THF solution)
Sample injection volume: 20 μL In the acrylic block copolymer in the art disclosed herein, a monomer (other monomer) other than an alkyl(meth) acrylate may be copolymerized. Examples of the other monomer include vinyl compounds having functional groups such as alkoxy group, epoxy group, hydroxy group, amino group, amide group, cyano group, carboxyl group, acid anhydride group, etc.; vinyl esters such as vinyl acetate; aromatic vinyl compounds such as styrene; vinyl group-containing heterocyclic compounds such as N-vinylpyrrolidone and the like. Alternatively, it can be an alkyl acrylate having a structure with an acryloyl group coupled to a fluorinated alkyl group, a fluorinated alkyl acrylate and a fluorinated alkyl methacrylate. The other monomer may be used, for instance, to adjust the properties of the acrylic viscoelastic material. The other monomer content is suitably 20% by weight or less (e.g. 10% by weight or less, typically 5% by weight or less) of all the monomers constituting the acrylic block copolymer. In a preferable embodiment, the acrylic block copolymer is essentially free of the other monomers. For instance, in a preferable acrylic block copolymer, the other monomer content is less than 1% by weight (typically 0 to 0.5% by weight) of all monomers or under the detection limit.

Such an acrylic block copolymer can be readily synthesized by a known method (e.g. see Japanese Patent Application Publication Nos. 2001-234146 and H11-323072), or a commercial product is readily available. Examples of the commercial product include trade name KURARITY series (e.g., those with product numbers LA2140e, LA2250, etc.) available from Kuraray Co., Ltd., trade name "NABSTAR" available from Kaneka Corporation, and the like. As the method for synthesizing the acrylic block copolymer, living polymerization method can be preferably employed. According to living polymerization, while keeping the weatherability inherent in the acrylic polymer, an acrylic block copolymer having excellent thermoplasticity can be synthesized due to the excellent structure control unique to the living polymerization. In addition, since the molecular weight distribution can be controlled in a narrow range, insufficient cohesion caused by the presence of low molecular weight components can be prevented, whereby the second layer with excellent anti-loosening properties can be obtained.

For the acrylic block copolymer, solely one species or a combination of two or more species can be used. For instance, an acrylic block copolymer $B_H$ with a relatively high Mw and an acrylic block copolymer $B_L$ with a lower Mw than the acrylic block copolymer $B_H$ can be used at a suitable weight ratio. For instance, it is preferable to combine a $B_H$ having a Mw in a range of $5 \times 10^4$ to $20 \times 10^4$ (e.g. $7 \times 10^4$ to $20 \times 10^4$) and a $B_L$ having a Mw in a range of $3 \times 10^4$ to $8 \times 10^4$ and lower than the Mw of the $B_H$. The $B_H$ to $B_L$ weight ratio ($B_L/B_L$) is not particularly limited and can be, for instance, in a range of 5/95 to 95/5, 10/90 to 90/10, 40/60 to 90/10, or even 55/45 to 90/10. The inclusion (presence) of two or more species of acrylic block copolymer with different Mw values, the Mw values of the respective acrylic block copolymers and their weight ratio can be assessed, for instance, by GPC analysis as described earlier.

In addition to the acrylic polymer, the viscoelastic material forming the second layer may comprise a non-acrylic polymer as an optional component in order to enhance the low-temperature properties, reduce the adhesive strength, to enhance the handling properties, to improve the productivity, etc. Examples of such a polymer (or the optional polymer hereinafter) include polyolefins, polyesters, vinyl acetate-based polymers and vinyl chloride-based polymers. These polymers can be used singly as one species or in a combination of two or more species. The optional polymer content per 100 parts by weight of the acrylic polymer can be selected in accordance with the purpose or a particular circumstance. For instance, it can be 100 parts by weight or less, about 70 parts by weight or less, about 50 parts by weight or less, about 30 parts by weight or less, about 10 parts by weight or less, or even about 5 parts by weight or less. The viscoelastic material forming the second layer can be essentially free of an optional polymer. For instance, the optional polymer content per 100 parts by weight of the acrylic polymer can also be less than 1 part (typically 0 to 0.5 part) by weight.

(Oligomer)

In the art disclosed herein, the viscoelastic material forming the second layer may comprise an oligomer as an optional component for adjusting the viscosity (e.g. lowering the melt viscosity), controlling the adhesive properties of the PSA tape roll (e.g. reducing the adhesive strength), improving the operational feeling (e.g. the response from the resistance associated with rolling of the tape roll over the target surface), etc. The Mw of the oligomer is not particularly limited. It is typically about 3000 or less. In an embodiment, the oligomer's Mw can be about 20000 or less, or even about 10000 or less (e.g. about 5000 or less). The oligomer's Mw can be about 300 or greater, or even about 500 or greater (e.g. about 800) or greater).

The oligomer is not particularly limited. Known acrylic oligomer, urethane-based oligomer, acrylic urethane-based oligomer, silicone acrylic oligomer, organosiloxane-based oligomer, polyester-based oligomer, polyolefinic oligomer, vinyl ether-based oligomer and the like can be used. The oligomers can be used singly as one species or in a combination of two or more species. The oligomer used can be produced by a known method or commercial products are readily available.

From the standpoint of the compatibility with the base polymer, in an embodiment, a preferable oligomer comprises a monomer unit derived from an acrylic monomer, such as an acrylic oligomer and an acrylic urethane-based oligomer. The acrylic monomer content of the monomers forming the oligomer is typically about higher than 50% by weight, preferably about 70% by weight or higher, more preferably about 85% by weight or higher, possibly about 90% by weight or higher, or it can be essentially 100% by weight. The acrylic oligomer can be a random copolymer of a starting monomer mixture comprising an acrylic monomer as the primary component.

When an oligomer is used, its amount used is not particularly limited. In an embodiment, the amount of the oligomer used to 100 parts by weight of the base polymer can be, for instance, about 150 parts by weight or less, and usually suitably about 100 parts by weight or less (e.g. about 80 parts by weight or less). To 100 parts by weight of the base polymer, the amount of the oligomer used can be, for instance, about 5 parts by weight or greater, about 10 parts by weight or greater, or even about 20 parts by weight or greater (e.g. about 30 parts by weight or greater). In another embodiment, the amount of the oligomer used to 100 parts by weight of the base polymer can be, for instance, about 25 parts by weight or less, or even about 10 parts by weight or less (e.g. about 5 parts by weight or less). The art disclosed herein can be preferably implemented in an embodiment where the acrylic viscoelastic material forming the second layer is essentially free of an oligomer. For instance, the oligomer content per 100 parts by weight of the base polymer can be less than 1 part (typically 0 to 0.5 part) by weight.

(Filler)

In the art disclosed herein, the viscoelastic material forming the second layer may comprise a filler. The inclusion of the filler in the second layer can bring about effects such as lower temperature-dependence of the unwinding force, reduced adhesive strength, enhanced anchoring, and easier hand-tearing of the PSA tape.

The type of filler used is not particularly limited. For instance, particulate or fibrous filler can be used. Examples of the material forming the filler (typically particulate filler) include inorganic materials such as carbonates including calcium carbonate, sodium carbonate, and sodium bicarbonate; metal oxides including titanium oxide, silica, alumina, zirconia, zinc oxide, tin oxide, copper oxide, and nickel oxide; metal hydroxides and hydrated metal compounds including aluminum hydroxide, boehmite, talc, magnesium hydroxide, calcium hydroxide, zinc hydroxide, silicate, iron hydroxide, copper hydroxide, barium hydroxide, hydrated zirconium oxide, hydrated tin oxide, basic magnesium carbonate, hydrotalcite, dawsonite, borax, and zinc borate; carbides including silicon carbide, boron carbide, nitrogen carbide, and calcium carbide; nitrides including aluminum nitride, silicon nitride, boron nitride, and gallium nitride; titanates including barium titanate and potassium titanate: carbonaceous substances including carbon black, carbon tube (carbon nanotube), carbon fibers, and diamond; and glass: metals such as copper, silver, gold, platinum, nickel, aluminum, chromium, iron, and stainless steel; and polymers such as polystyrene, acrylic resin (e.g. polymethyl methacrylate), phenol resin, benzoguanamine resin, urea resin, silicone resin, polyester, polyurethane, polyethylene, polypropylene, polyamide (e.g. nylon, etc.), polyimide, and polyvinylidene chloride. Alternatively, particles of a natural raw material can also be used, such as volcanic shirasu (ash), clay and sand. As the fibrous filler, various synthetic fibers and natural fibers can be used. These can be used singly as one species or in a combination of two or more species. A pigment can be used as part of or as the entirety of the filler. The pigment can be inorganic or organic. Similarly, the PSA forming the first layer may have a filler-containing composition.

While no particular limitations are imposed, the average particle diameter of the filler can be, for instance, about 100 μm or smaller, about 50 μm or smaller, or even about 30 μm or smaller (e.g. about 15 μm or smaller). From the standpoint of the ease of forming the second layer and its surface smoothness, the average particle diameter of the filler is preferably about 70% or less (typically about 50% or less. e.g. about 30% or less) of the thickness of the second layer. From the standpoint of the dispersibility and the handleability of the filler, a filler having an average particle diameter of about 0.01 μm or larger (typically about 0.1 μm or larger, e.g. about 1 μm or larger) can be preferably used.

In an embodiment where the viscoelastic material forming the second layer comprises a filler, the percent weight of the filler in the second layer (the weight ratio of the filler in the second layer) is not particularly limited, and can be selected so as to obtain desirable effects. The percent weight can be, for instance, about 0.1% or higher (typically about 0.5% or higher), about 1% or higher, about 3% or higher, about 5% or higher, or even about 10% or higher. In an embodiment of the art disclosed herein, the percent weight of the filler in the second layer can be about 20% or higher, or even about 30% or higher (e.g. about 40% or higher). From the standpoint of the ease of forming the second layer and the retention of the shape, the percent weight of the filler is usually suitably about 75% or lower, or preferably about 60% or lower (e.g. about 50% or lower). In an embodiment, the percent weight of the filler can also be lower than 10%, for instance, lower than 5%. The component(s) other than the filler in the second layer can be thought as elastomers (non-hard components). Accordingly, the percent (%) weight R of the elastomer content in the filler-containing second layer can be thought as the value obtained by subtracting the percent weight of the filler in the second layer from 100%. In the second layer free of a filler, the percent (%) weight R of the elastomer content is 100%.

(Tackifier)

The viscoelastic material forming the second layer can comprise a tackifier as necessary. The tackifier may be useful in adjusting the adhesive strength as well as in increasing the thermoplasticity of the viscoelastic material (e.g. decreasing the melt viscosity), etc. As the tackifier, a tackifier resin known in the field of PSA (e.g. acrylic PSA) and the like can be used. Examples include a hydrocarbon-based tackifier resin, terpene-based tackifier resin, rosin-based tackifier resin, phenolic tackifier resin, epoxy-based tackifier resin, polyamide-based tackifier resin, elastomer-based tackifier resin and ketone-based tackifier resin. These can be used singly as one species or in a combination of two or more species. Similarly, the PSA forming the first layer may have a composition that comprises a tackifier.

The softening point of the tackifier is not particularly limited. From the standpoint of reducing the melt viscosity, it is preferably about 160° C. or lower, or more preferably about 140° C. or lower (e.g. about 120° C. or lower). From the standpoint of the low-temperature properties (e.g. the flexibility at a low temperature) of the second layer, a tackifier having a softening point of about 100° C. or lower (e.g. about 80° C. or lower) can be used as well. The tackifier typically has a softening point of 60° C. or higher. The softening point of the tackifier is determined based on the softening point test method (ring and ball method) specified in JIS K 2207.

When a tackifier is used, its amount used is not particularly limited. In an embodiment, the amount of the tackifier used to 100 parts by weight of the base polymer can be about 1 part by weight or greater, or even about 5 parts by weight or greater (e.g. about 10 parts by weight or greater). From the standpoint of avoiding degradation of the low-temperature properties, the amount of the tackifier is usually suitably about 50 parts by weight or less to 100 parts by weight of the base polymer, or preferably about 30 parts by weight or less (e.g. about 20 parts by weight or less). The second layer may be essentially free of a tackifier.

(Plasticizer)

The viscoelastic material forming the second layer may comprise a plasticizer as necessary. The plasticizer may be useful in reducing the melt viscosity, reducing the adhesive strength, enhancing the low-temperature properties, etc. Examples of plasticizer include phthalic acid esters such as dioctyl phthalate, diisononyl phthalate, diisodecyl phthalate, dibutyl phthalate, etc.; adipic acid esters such as dioctyl adipate, diisononyl adipate, etc., trimellitic acid esters such as trioctyl trimellitate, etc.; sebacic acid esters; epoxidized vegetable oils such as epoxidized soybean oil and epoxidized flax seed oil; epoxidized fatty acid alkyl esters such as epoxidized fatty acid octyl esters; cyclic fatty acid esters as well as their derivatives such as sorbitan monolaurate, sorbitan monostearate, sorbitan monooleate, sorbitan trioleate and their ethylene oxide adducts; and the like. These can be used singly as one species or in a combination of two or more species. Similarly, the PSA forming the first layer may have a composition that comprises a plasticizer.

When a plasticizer is used, its amount used is not particularly limited. In an embodiment, the amount of the tackifier used to 100 parts by weight of the base polymer can be about 1 part by weight or greater, about 5 parts by weight or greeter (e.g. about 10 parts by weight or greater). From the standpoint of preventing the plasticizer from transferring (migrating) to the backside of the PSA tape or to the surface being cleaned, the amount of the plasticizer used is usually suitably about 100 parts by weight or less to 100 parts by weight of the base polymer, or preferably about 50 parts by weight or less (e.g. about 30 parts by weight or less). The second layer may be essentially free of a plasticizer.

(Crosslinking Agent)

The viscoelastic material forming the second layer can be crosslinked as necessary. For crosslinking the material, known crosslinking agents can be used such as organometallic salts including zinc stearate and barium stearate, epoxy-based crosslinking agents, isocyanate-based crosslinking agent, oxazoline-based crosslinking agent, aziridine-based crosslinking agent, metal chelate-based crosslinking agent and melamine-based crosslinking agent. The crosslinking agents can be used singly as one species or in a combination of two or more species. The amount of the crosslinking agent used is not particularly limited. In an embodiment, the amount of the crosslinking agent used to 100 parts by weight of the base polymer can be about 0.01 part by weight or greater (typically about 0.02 part by weight or greater, e.g. 0.05 part by weight or greater) and about 10 parts by weight or less (e.g. about 5 parts by weight or less). The viscoelastic material may form a non-crosslinked second layer without applying a specific crosslinking means. This is preferable from the standpoint of the productive convenience, etc.

(Other Components)

To the second layer in the art disclosed herein, various additives known in the field of acrylic viscoelastic materials (e.g. acrylic PSA) can be added as necessary, such as anti-aging agent, antioxidant, UV absorber, photostabilizer, antistatic agent, and dye. The types of such optional additives and their amounts added can be comparable to usual species and amounts added with respect to these types of material.

(Elongation at Break)

The viscoelastic material forming the second layer may exhibit an elongation at break of preferably about 2000% or less, or more preferably about 1000% or less (e.g. about 500% or less). A smaller elongation at break tends to facilitate hand-tearing of the PSA tape. From the standpoint of the flexibility and the durability of the second layer, the elongation at break is usually suitably about 30% or greater, or preferably about 50% or greater (e.g. about 100% or greater).

The elongation at break of the viscoelastic material is determined based on the method for determining "Elongation" described in JIS K 7311:1995. More specifically, using a No. 3 dumbbell-shaped test piece (1 mm thick, 5 mm wide, 10 mm line spacing), the elongation at break can be determined at a tensile speed of 300 mm/min. As the tensile tester, product name AUTOGRAPH AG-10G tensile tester available from Shimadzu Corporation can be used. For the testing, the adhesive face is preferably covered with powder to eliminate influences of the stickiness of the PSA. The same method is also employed in Examples described later. The elongation at break can be adjusted, for instance, by the composition of the viscoelastic material forming the second layer (selection of the types of components in the viscoelastic material and their amounts, etc.).

(Breaking Strength)

The breaking strength of the viscoelastic material forming the second layer is not particularly limited. It is usually suitably about 50 N/10 mm or less, or can be about 20 N/10 mm or less (e.g. about 10 N/10 mm or less). Smaller breaking strength tends to facilitate hand-tearing of the PSA tape. From the standpoint of the durability of the second layer, etc., the breaking strength is usually suitably about 1 N/10 mm or greater, or can be about 2 N/10 mm or greater (e.g. about 3 N/10 mm or greater).

The breaking strength of the viscoelastic material is determined based on the method for determining "Tensile Strength" described in JIS K 7311:1995 as the value per 10 mm width of the viscoelastic material subjected to the measurement (i.e. as the value in N/10 mm). More specifically, using a No. 3 dumbbell-shaped test piece (1 mm thick, 5 mm wide, 10 mm line spacing), the breaking strength can be determined at a tensile speed of 300 mm/min. The tensile tester and other conditions are basically the same as for the elongation at break. The same method is used in Examples described later. The breaking strength can be adjusted, for instance, by the composition of the viscoelastic material forming the second layer (selection of the types of components in the viscoelastic material and their amounts, etc.).

(AR Value)

The art disclosed herein can be preferably implemented in an embodiment where the product of the cross-sectional area A (mm$^2$) of the second layer in a widthwise cross section of the PSA tape times the percent (%) weight R of the elastomer content in the second layer (i.e. the value of AR, or the AR value hereinafter) is about 2.5 or less. In such an embodiment, hand-tearing of the PSA tape may be facilitated. For instance, when the PSA tape is torn off, formation of sticky strings of the second layer can be inhibited. Formation of sticky strings may occur, in typical, in an embodiment where a line of the second layer runs across an expected tear-off location in the PSA tape. When the PSA tape is torn off, the substrate is torn apart while the second layer is not, whereby the second layer is stretched between the two separate pieces of the substrate to form sticky strings. Significant stringiness leads to issues such as difficult tearing and degraded appearance. With the stretched part of the second layer forming the renewed adhesive face (the adhesive face exposed upon the tearing on the surface of the PSA tape roll), the surface state of the adhesive face may be distorted. By limiting the AR value, the stringiness of the second layer may be suppressed.

The cross-sectional area A (mm$^2$) of the second layer can be, for instance, about 0.001 mm$^2$ or larger, it is usually suitably about 0.005 mm$^2$ or larger, also about 0.007 mm$^2$ or larger, or even about 0.01 mm$^2$ or larger. In an embodiment, the cross-sectional area A (mm$^2$) of the second layer can be about 0.015 mm$^2$ or larger, or even about 0.02 mm$^2$ or larger. The cross-sectional area A (mm$^2$) of the second layer can be, for instance, about 5 mm$^2$ or smaller; it is usually suitably about 1 mm$^2$ or smaller, possibly about 0.5 mm$^2$ or smaller, about 0.1 mm$^2$ or smaller, or even about 0.05 mm$^2$ or smaller. In an embodiment, the cross-sectional area A (mm$^2$) of the second layer may be about 0.03 mm$^2$ or smaller (e.g. about 0.02 mm$^2$ or smaller).

Here, the cross-sectional area A (mm$^2$) of the second layer refers to the surface area of the second layer that appears in a widthwise cross section of the PSA tape. The cross-sectional area of the second layer can be obtained, for instance, by analyzing the cross section with a scanning electron microscope. With respect to the second layer formed in lines running in the length direction of the PSA tape, the cross-sectional area of the second layer may be determined from the weight of the second layer contained per unit length of the PSA tape and the specific gravity of the second layer. In determining the AR value, A refers to the numerical value of the cross-sectional area (in mm$^2$) of the second layer, but without the unit. In determining the AR value, R refers to the numerical value of the percent (%)

weight of the elastomer content in the viscoelastic material forming the second layer, but without the unit. Thus, the AR value is a dimensionless number.

In the art disclosed herein, the AR value is preferably about 2.3 or less, more preferably about 2.1 or less, or can be about 2.0 or less (e.g. about 1.7 or less). With decreasing AR value, formation of sticky strings of the second layer tends to be further suppressed. The minimum AR value is not particularly limited. For instance, it can be about 0.1 or greater. From the standpoint of the ease of forming the second layer and the retention of its shape, the AR value is usually suitably about 0.3 or greater, or can also be about 0.5 or greater (e.g. about 0.7 or greater). In an embodiment, the AR value can be about 1.0 or greater (e.g. about 1.2 or greater). The AR value can be adjusted by the line width and the thickness of the second layer in a widthwise cross section of the PSA tape, the amount of the filler used in the second layer, etc.

(Rotational Resistance)

The PSA tape roll disclosed herein has a rotational resistance of preferably about 3 N/150 mm or greater (e.g. about 4 N/150 mm or greater). The rotational resistance is preferably about 12 N/150 mm or less, or about 15 N/150 mm or less. The PSA tape roll with such a level of rotational resistance is preferable since favorable operational feeling is likely to be provided. For instance, when it is rolled over a surface to be cleaned, it provides a suitable response (resistance) against operation, whereby a user is more likely to feel assured of cleaning effects. When the rotational resistance is not excessively high, the load on a user is reduced and rail drawing is less likely to occur. The rotational resistance can be determined by the method described later in Examples. The PSA tape roll satisfying the rotational resistance on more diverse surfaces (e.g. carpet, waxed flooring surface, wax-free flooring surface, etc.) to be cleaned is preferable.

Second Embodiment

Figure 5:
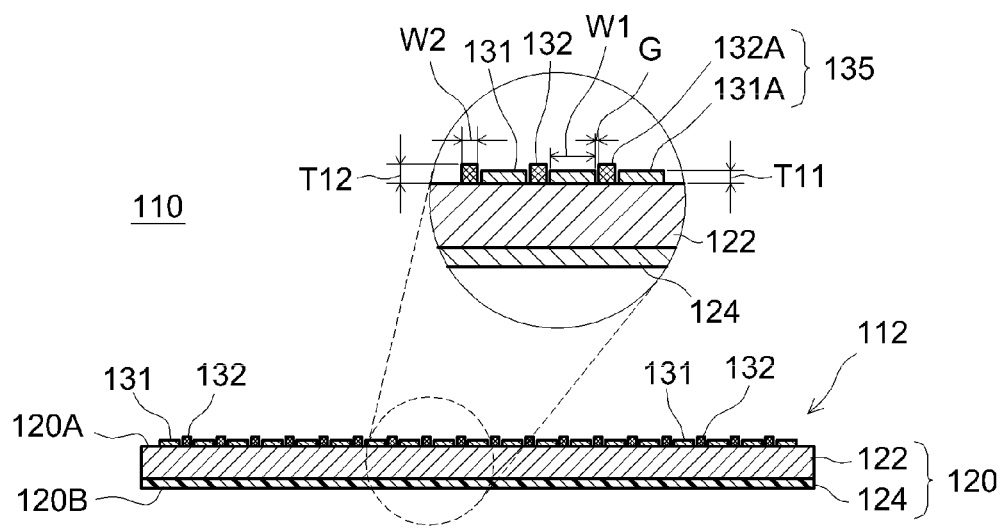
FIG. 5 shows a cross-sectional diagram schematically illustrating the PSA tape forming the PSA tape roll in the sticky cleaner according to another embodiment.

FIG. 5 shows a cross-sectional diagram schematically illustrating the PSA tape forming the PSA tape roll in another embodiment of this invention. PSA tape 112 has a substrate 120, a first layer 131 directly provided onto the first face 120A thereof, and a second layer 132 directly provided onto the first face 120A without overlapping the first layer 131. The first layer 131 can be formed from a PSA (e.g. a rubber-based PSA) comparable to that of the first layer in the first embodiment. The second layer 132 can be formed from a viscoelastic material (typically an acrylic viscoelastic material, e.g. an acrylic PSA) comparable to the second layer in the first embodiment.

In the present embodiment, PSA tape 112 has straight lines of the second layer 132 running in the length direction of PSA tape 112 and these lines of the second layer 132 are arranged almost in parallel to one another (in a stripe pattern), separated by spaces in the width direction of the PSA tape 112. The PSA tape 112 in this embodiment has straight lines of the first layer 131 running in the length direction of PSA tape 112. The respective lines of the first layer 131 are arranged almost in parallel to one another (in a stripe pattern) between adjacent lines of the second layer 132. In other words, lines of the first layer 131 and lines of the second layer 132 are arranged alternately when viewed across the width. The first sections 131A where the first layer 131 is exposed and the second sections 132A where the second layer 132 is exposed form the adhesive face 135 which is adhesive as a whole. The width (W2 in FIG. 5) of the second layer can be selected from a comparable range to the width range of the second layer in the first embodiment described earlier.

The width (W1 in FIG. 5) of the first layer 131 can be, for instance, about 0.1 mm or greater, also about 0.3 mm or greater, or even about 0.5 mm or greater. The width W1 of the first layer 131 can be, for instance, about 50 mm or less; it is usually suitably about 20 mm or less, about 10 mm or less, about 5 mm or less, about 1 mm or less, or even about 0.5 mm or less. By adjusting W1, the unwinding force and the operational feeling during use can be adjusted. When the line width of the first layer 131 changes from place to place, the aforementioned ranges of W1 values can be applied to the average line width over a certain length.

While no particular limitations are imposed, the width W1 of the first layer can be, for instance, about 0.5 times to 20 times (typically 1 times to 10 times) the width W2 of the second layer, it is usually suitably about 1 times to 5 times. In an embodiment, W1 can be greater than W2 (i.e. W1>W2). For instance, W1 can be at least about 1.1 times W2, also at least about 1.3 times W2, or even at least about 1.5 times W2.

The first layer 131 and the second layer 132 can be formed so that the thickness T12 of the second layer 132 is greater than the thickness T11 of the first layer 131. The difference in thickness (T12−T11) between the first and second layers 131, 132 can be selected, for instance, from a range comparable to the protruding height T2 of the second sections relative to the first sections in the first embodiment. The thickness T11 of the first layer 131 can be selected from a range comparable to the thickness T1 of the first layer in the first embodiment. The thickness T12 of the second layer 132 can be selected from a range comparable to the height H from the first face of the substrate to the second sections in the first embodiment.

The first layers 131 and the adjacent second layers 132 may be partially or entirely in contact, or may be separated by a space G The presence of the space G between the first and second layers 131 and 132 may inhibit changes in properties of PSA tape 112 caused by transfer (diffusion) of components from one layer to the other layer. The presence of the space G may contribute to the cushioning properties of PSA tape 112 and PSA tape roll 110 obtainable by winding the same.

The presence of the space G increases the surface area of the adhesive face 135, likely enhancing the abilities to collect and store dust. The width of the space G can be, for instance, 0.01 mm or greater, 0.05 mm or greater, or even 0.1 mm or greater. The width of the space G can be, for instance, 5 mm or less, 1 mm or less, or even 0.5 mm or less.

As the substrate, similarly to the substrate in the first embodiment, various types of resin film, paper, fabric, rubber sheet, foam sheet, metal foil, a composite of these and the like can be used. One or each of the first and second faces of the substrate may be subjected as necessary to a surface treatment as described about the first embodiment.

From the standpoint of the strength and the flexibility, favorable examples of the resin film possibly used as the substrate or a component thereof include polyolefin film. The polyolefin film comprises as the primary component a polymer whose primary monomer (the primary component among its monomers) is an α-olefin. The polymer content is usually 50% by weight or higher (e.g. 80% by weight or higher, typically 90% to 100% by weight). Specific examples of the polyolefin include PE whose primary monomer is ethylene, and PP whose primary monomer is propylene. The PE can be ethylene homopolymer, a copolymer of ethylene and other olefin (e.g. one, two or more species selected among α-olefins with 3 to 10 carbon atoms), or a copolymer of ethylene and a non-olefinic monomer (e.g. one, two or more species selected from ethylenic unsaturated monomers such as vinyl acetate, acrylic acid, methacrylic acid, methyl acrylate, and ethyl acylate). The PP can be propylene homopolymer, a copolymer of propylene and other olefin (e.g. one, two or more species selected among α-olefins with 2 or 4 to 10 carbon atoms), or a copolymer of propylene and a non-olefinic monomer. The substrate disclosed herein may comprise solely one species of polyolefin among them or may comprise two or more species of polyolefin.

From the standpoint of increasing the strength, the polyolefin film may comprise a high density polyethylene (HDPE). As used herein, the HDPE typically refers to a polyethylene having a density of 0.940 g/cm$^3$ or greater. From the standpoint of increasing the strength (e.g. the tensile strength), the HDPE content in the substrate is preferably 10% by weight or higher, or more preferably 20% by weight or higher (e.g. 30% by weight or higher, typically 35% by weight or higher). In view of the conformability to surface contours, the HDPE content in the substrate can be usually 80% by weight or lower (e.g. 70% by weight or lower, typically 60% by weight or lower).

From the standpoint of increasing the flexibility, the polyolefin film may comprise a low density polyethylene (LDPE). As used herein, the LDPE refers to a polyethylene having a density of less than 0.940 g/cm$^3$. The LDPE disclosed herein can be, for instance, an LDPE obtainable by high pressure polymerization of ethylene monomers, an LDPE obtainable by low pressure polymerization of ethylene and an α-olefin monomer with 3 to 8 carbon atoms, a copolymer of ethylene and an α-olefin with the copolymer having an aforementioned density, etc. The concept of LDPE in the art disclosed herein encompasses species called very low density polyethylene (VLDPE) and species called linear low density polyethylene (LLDPE). As the LDPE, solely one species or a combination of two or more species can be used.

The art disclosed herein can be preferably implemented in an embodiment comprising a substrate formed using an HDPE-containing polyolefin film (typically a PE film). From the standpoint of increasing the strength (e.g. the tensile strength), the HDPE content in the polyolefin film is preferably 10% by weight or higher, 30% by weight or higher (e.g. 50% by weight or higher), or even 70% by weight or higher (e.g. 85% by weight or higher). A polyolefin film essentially formed of a HDPE (a polyolefin film of which HDPE accounts for 99% to 100% by weight) can also be used. Alternatively, in view of the flexibility of the substrate, a polyolefin film of which HDPE accounts for 95% by weight or less (e.g. 90% by weight or less, or even 75% by weight or less) can be used as well.

The art disclosed herein can be preferably implemented in an embodiment comprising a substrate formed using a polyolefin film (typically a polyethylene film) comprising HDPE and LDPE. The use of such a polyolefin film as the substrate or a component thereof can combine strength and flexibility at a high level. The combined amount of HDPE and LDPE in the polyolefin film is not particularly limited. It is preferably 50% by weight or greater (e.g. 80% by weight or greater, typically 90% to 100% by weight). The art disclosed herein can be preferably implemented in an embodiment where the polyolefin film is essentially free of other materials besides the HDPE and the LDPE. When HDPE and LDPE are used together, the weight ratio of HDPE to LDPE in the substrate is not particularly limited, but is usually about 10:90 to 90:10, or preferably 20:80 to 80:20 (e.g. 30:70 to 70:30, typically 35:65 to 65:35).

The polyolefin film may comprise a non-polyolefinic polymer in addition to the polyolefin. Favorable examples of the non-polyolefinic polymer include the various polymer materials exemplified as the resin film possibly forming the substrate, excluding the polyolefins. The non-polyolefinic polymer content if any is suitably less than 100 parts by weight to 100 parts by weight of the polyolefin, preferably 50 parts by weight or less, more preferably 30 parts by weight or less, or yet more preferably 10 parts by weight or less. The non-polyolefinic polymer content can be 5 parts by weight or less to 100 parts by weight of the polyolefin, or can be even 1 part by weight or less. The art disclosed herein can be preferably implemented in an embodiment where, for instance, a polyolefin accounts for 99.5% to 100% by weight of the polyolefin film.

To the substrate, various additive may be added as necessary, such as fillers (inorganic fillers, organic fillers, etc.), anti-aging agent, antioxidant, UV absorber, antistatic agent, lubricant, plasticizer, and colorant (pigment, dye, etc.). The amount of the various additives added is usually about 30% by weight or less (e.g. 20% by weight or less, typically 10% by weight or less). For instance, when a pigment (e.g. a white pigment) is included in the substrate, its content is suitably about 0.1% to 10% (e.g. 1% to 8%, typically 1% to 5%) by weight.

The substrate may have a monolayer structure or a multilayer structure in which two or more layers are laminated. For instance, the substrate may have a multilayer (e.g. bilayer) structure in which a polyolefin layer H comprising HDPE as the primary polymer (a component accounting for more than 50% of polymers by weight) is laminated with a polyolefin layer L comprising at least LLDPE or VLDPE as the primary polymer. The combined amount of LLDPE and VLDPE in the polyolefin layer L is typically 60% by weight or greater, preferably 75% by weight or greater, or possibly 90% by weight or greater. Usually, from the standpoint of the strength and the ease of hand-tearing, the polyolefin layer H preferably has a thickness larger than that of the polyolefin layer L. A favorable example of the polyolefin layer L is a VLDPE layer comprising VLDPE as the primary polymer (typically a component accounting for more than 50% by weight, preferably 75% by weight or more. e.g. 90% by weight or more, of the polymer content).

The polyolefin layer L can be the layer (backside layer) forming the second face of the substrate. For instance, as shown in FIG. 5, the substrate disclosed herein may be a substrate 120 having a multilayer structure in which a support layer 122 formed of the polyolefin layer H and a backside layer 124 formed of the polyolefin layer L are laminated. A substrate whose second face is formed of the polyolefin layer L has an advantage such that a suitable unwinding force is likely to be obtained even if the release treatment to the second face is omitted or weakened. An example of the polyolefin layer L favorable to obtain such an advantage is a VLDPE layer. The thickness of the backside layer can be, for instance, about 1 µm to 200 µm, or it is usually suitably about 2 µm to 100 µm (typically 5 µm to 50 µm). In an embodiment, the thickness of the backside layer can be about 2 µm to 20 µm, or even about 3 m unto 15 µm (e.g. 5 µm to 10 µm). It should be noted that, even in an embodiment where the second face of the substrate is formed of the polyolefin layer L, the polyolefin layer L can be subjected to a suitable surface treatment (e.g. release treatment) as necessary. Such an embodiment is also included in the art disclosed herein.

In the art disclosed herein, the resin film used as the substrate or a component thereof can be formed using a biomass material. Here, the biomass material refers to a reproducible material originating from an organic resource. Typically, it refers to a material originating from a biological resource (typically a photosynthetic plant) that is sustainable and reproducible in the presence of sun light, water and carbon dioxide. Thus, it excludes a material derived from fossil resources (a fossil-derived material) which would be exhausted upon use after mined. The biomass material can be, for instance, the reproducible organic resource itself or a material obtainable by chemical or biological synthesis of the organic resource (typically a substance forming an organism). For instance, the biomass material may be obtained from a plant such as sugarcane and corn. In particular, the biomass material can be ethanol produced from sugarcane or a material obtainable from saccharides produced from corn. For instance, as the HDPE described above, an HDPE being a biomass material (biomass HDPE) can be used. Similarly, for instance, as the aforementioned LDPE, LLDPE, PP and the like, the corresponding biomass materials (e.g. biomass LDPE) can be used.

The substrate used in the art disclosed herein may have contours (depressions and/or protrusions) at least on one face. The use of a substrate having such a contoured surface (e.g. a substrate formed including resin film such as polyolefin film) can provide cushioning properties to the PSA tape or to the PSA tape roll obtained by winding the PSA tape. The contours can be used to control the tightness of adhesion between the backside of the substrate and the adhesive face and to adjust the unwinding force or the unwinding force ratio of the PSA tape roll.

The substrate having a contoured surface may be a substrate having depressions at least on one face. For instance, it can be a substrate having the depressions on the second face (the backside. i.e. the face opposing the adhesive face) thereof. The depressions may be serially arranged in a continuous or intermittent straight line at least on one face (e.g. the second face) of the substrate. In an embodiment, the depressions can be aligned in a direction intersecting the length direction of the PSA tape. The PSA tape comprising a substrate in such an embodiment can be easily cut off along the depressions in the substrate and easily torn off by hand. From the standpoint of the ease of hand-tearing, the depressions are preferably arranged in a sequence from one lengthwise edge to the other lengthwise edge of the substrate. The angle between the length direction of the PSA tape and the direction of the row of the depressions can be, for instance, 90°±60° (i.e. 30° or larger and 150° or smaller), preferably 90°±45°, more preferably 90°±30°, yet more preferably 90°±15°, or even 90°±5°. In a preferable embodiment, the direction of the row of the depressions may be a direction vertically intersecting the length direction of the PSA tape (i.e. a direction with the aforementioned angle being 90°). The PSA tape in such an embodiment exhibits excellent ease of hand-tearing in the width direction.

Figure 6:
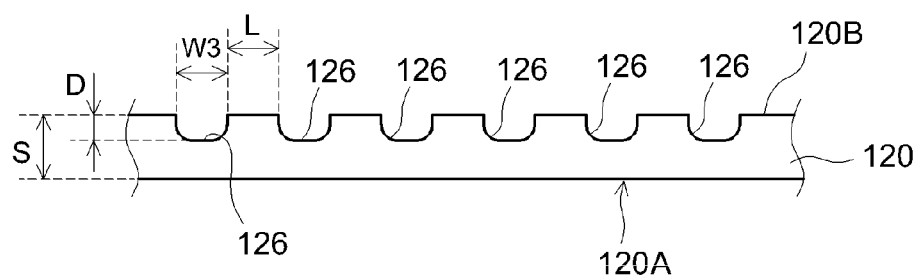
FIG. 6 shows a cross-sectional diagram schematically illustrating the substrate of the sticky cleaner shown in FIG. 5.

With reference to FIG. 6, a favorable example of the substrate having contours on the surface is described. As illustrated, depressions 126 are formed on the second face (backside) 120B of substrate 120. These depressions 126 are arranged in a straight row on the surface. The horizontal direction (the direction of X-axis) in FIG. 6 corresponds to the width direction of substrate 120. Depressions 126 are aligned in the width direction (i.e. a direction vertically intersecting the length direction) of substrate 120. With respect to the length direction of substrate 120, an arrangement where depressions 126 are aligned in the length direction can be preferably used. In other words, depressions 126 may be arranged in a lattice pattern as a whole, with some of them aligned in the width direction of the substrate and others aligned in the length direction.

The bottom of a depression in the substrate may have a U-shaped cross section as shown in FIG. 6, a V-shaped cross section, a rectangular (angular U-shaped) cross section, or a composite or intermediate shape of these. The internal shape (the shape formed with the inner surface) of the depression can be, for instance, conical or truncated conical shape tapering toward a bottom such as cone, truncated square pyramid, trigonal pyramid, truncated trigonal pyramid, cone, and truncated cone; columnar shape including cylindrical and a polygonal column (e.g. a square column, triangular column); spherical shape, dish shape having a flat bottom and a spherical side wall (truncated spherical), or a composite or intermediate shape of these. In an embodiment, the internal shape of the depression can at least partially include a curved surface. The substrate having depressions in such a shape may be advantageous in view of hand-tearing the PSA tape and obtaining certain strength in the length direction. In a preferable embodiment of the art disclosed herein, the second face of the substrate has depressions 126 having a square pyramidal internal shape with curved edges and vertices, with the depressions 126 criss-crossed in the width and length directions of the substrate.

In view of the balance between ease of hand-tearing and strength, the depth D (the maximum depth, the distance indicated by D in FIG. 6) of the depression is preferably selected so that the ratio of D to the thickness S of the substrate, i.e. the ratio D/S, is in a range of 0.2 to 0.8 (e.g. 0.2 to 0.5). In particular, the depth D of the depression is usually suitably about 10 µm to 160 µm (e.g. 20 µm to 100 µm). In view of the balance between ease of hand-tearing and strength, the width (the distance indicated by W3 in FIG. 6) of the depression is preferably about 50 µm to 500 µm (e.g. 70 µm to 400 µm, typically 100 µm to 300 µm). In view of the balance between ease of hand-tearing and ease of forming depressions, the space between the depressions (the distance indicated by L in FIG. 6, it may be the space between two adjacent depressions) is preferably about 100 µm to 4000 µm (e.g. 300 µm to 3000 µm, typically 500 µm to 2000 µm). The depth, width and space of the depressions can be determined by electron microscopy.

FIG. 6 shows an example in which only the second face 120B of substrate 120 has contours, but it is not limited to this. Each of the first and second faces 120A and 120B of substrate 120 may have contours, or only the first face 120A of substrate 120 may have contours. For instance, in FIG. 6, protrusions (not shown in the drawing) corresponding to the arrangement and shapes of depressions 126 of the second face 120B may be formed on the first face 120A of substrate 120.

In this embodiment, depressions are arranged in a straight row (serially), but are not limited to this arrangement. For instance, the depressions may be arranged in a row such as a wavy row and a curved row. From the standpoint of the ease of hand-tearing, the depressions are preferably arranged in a straight row.

When depressions are formed on a face of the substrate, the number of depressions per unit length (/cm) on the face, counting one for each row of depressions lined up continuously or intermittently, is 2/cm to 20/cm (e.g. 2/cm to 15/cm, typically 5/cm to 15/cm).

The method for fabricating the substrate with surface contours is not particularly limited. For instance, it is possible to employ a method where resin film (polyolefin film, etc.) is fabricated by a known or commonly-used method such as thermoforming (T-die extrusion, inflation) and solution casting; subsequently, onto the resin film in a melted or softened state, a sort of a molding roll having a contoured surface is pressed to transfer the shape of the contoured surface onto the resin film, a method where onto a pre-molded resin film, a sort of a roll having a contoured surface is pressed to transfer the shape of the contoured surface; and the like. In a favorable example of the method for fabricating the substrate, resin film (favorably polyolefin film) extruded from a T-die (T-shaped die) is brought in contact with the surface of a cooling molding roll (embossing roll) featuring contours on the surface. For forming contours on the surface of pre-molded resin film, it is preferable to use non-stretched resin film in view of preventing deformation of the contours formed.

Third Embodiment

In some embodiments of the art disclosed herein, the PSA tape forming the PSA tape roll may be provided with an anti-rail-drawing portion where the adhesiveness of the PSA tape is reduced. The anti-rail-drawing portion is effective when placed on the inner circumferential side in the vicinity of the winding end edge of the PSA tape. In an embodiment, the anti-rail-drawing portion can be placed in an area from the winding end edge of the PSA tape to one-fourth the circumference (preferably one-sixth the circumference, more preferably one-eighth the circumference) inward (towards the roll core). Rail drawing of the PSA tape roll starts at the winding end edge of the PSA tape. By reducing the adhesiveness of the PSA tape in the vicinity of the winding end edge, the relationship between the adhesive strength to the target surface and the adhesive strength to the backside of the PSA tape (which may be related to the unwinding force) can be locally adjusted to effectively prevent rail drawing. When a tear-off location (e.g. cut holes 24 in FIG. 1) is designated in the PSA tape forming the PSA tape roll, the anti-rail-drawing portion can also be placed in an area from each tear-off location (i.e. a location where the PSA tape can be torn off to leave a new winding end edge) to one-fourth the circumference inward. The art disclosed herein can effectively prevent loosening of the PSA tape even in an embodiment where the anti-rail-drawing portion is provided inward from each tear-off location as described above.

The anti-rail-drawing portion is preferably formed, continuously or intermittently running in a direction (typically in the width direction) intersecting the length direction of the PSA tape. The anti-rail-drawing portion in such a configuration can inhibit degradation of the adhesive properties while effectively preventing rail drawing. In an embodiment, the anti-rail-drawing portion can be formed along the inward of the winding end edge. The anti-rail-drawing portion can be formed in a continuous or intermittent manner, entirely or partially over the length of the winding end edge.

Figure 7:
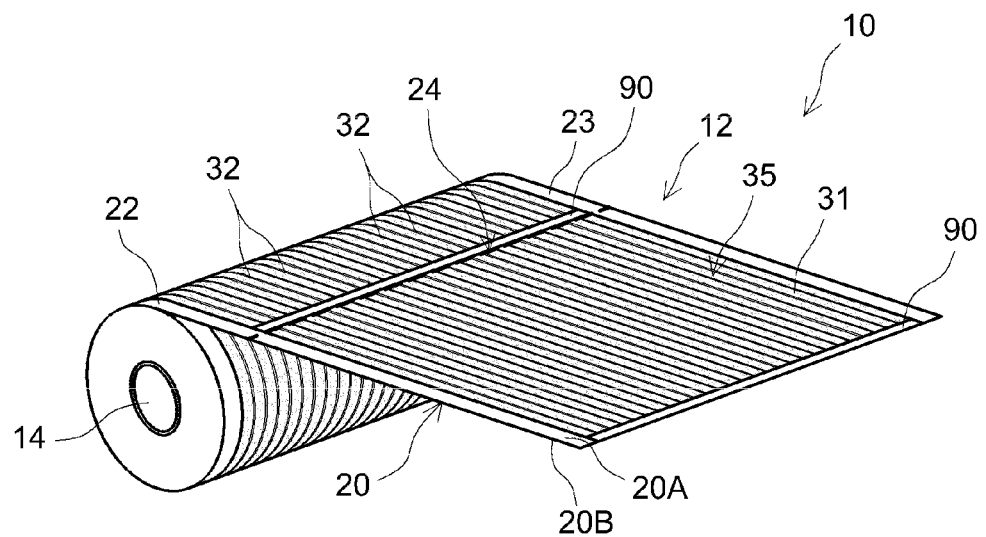
FIG. 7 shows a perspective diagram schematically illustrating the PSA tape roll of the sticky cleaner according to another embodiment.

The anti-rail-drawing portion is not limited to a particular embodiment as long as it can locally reduce the adhesive strength of the PSA tape. For instance, in the PSA tape roll in the first embodiment shown in FIG. 1, as shown in FIG. 7, an anti-rail-drawing portion can be formed by adhering lead tape 90 to the adhesive face 35 in an area next to the winding end edge of the PSA tape inward from the edge, wherein the lead tape 90 is formed of a sheet member having a non-adhesive or low-adhesive surface. In this embodiment, similar lead tape 90 is also placed in contact with each row of cut holes on the inner circumferential side of the roll. Lead tape 90 is not particularly limited. For instance, various types of resin film, paper, fabric, rubber sheet, foam sheet, metal foil a composite of these, and the like can be used. For instance, lead tape 90 can be band-shaped as shown in FIG. 7, but is not limited to this as long as it runs in the width direction of the PSA tape.

Placing such lead tape 90 can prevent rail drawing and also prevent the PSA tape from splitting in the length direction from the winding end edge when the adhesive face is renewed. In other words, when hair, lint and the like are stuck across the outer circumferential edge of the PSA tape roll, in a process of peeling the outer circumferential edge of the PSA tape from the PSA tape roll, the PSA tape may split in the length direction from the winding end edge due to the stuck hair, lint and the like. By placing lead tape 90 inward from the winding end edge of the PSA tape (and also inward from locations where the PSA tape can be torn off to leave new winding end edges), the winding end edge can be reinforced with the lead tape 90. This makes it easier to peel the PSA tape from the PSA tape roll with the stuck hair, lint and the like, thereby facilitating renewal of the adhesive face. From such a standpoint, in an embodiment, lead tape 90 with higher strength (tensile strength, tear strength, etc.) than that of substrate 21 can be preferably used. For instance, lead tape 90 formed of resin film such as PET and PP can be used. The resin film forming lead tape 9) may comprise an antistatic agent to make it less susceptible to dust accumulation. In an embodiment, as the lead tape 90, a material colored with a different color from that of substrate 20 can be preferably used. This makes it easier to locate the outer winding end edge or cut holes 24 in PSA tape 12.

In the art disclosed herein, the method for forming the anti-rail-drawing portion is not limited to a method where a non-adhesive or low-adhesive member such as the lead tape described above is placed on the adhesive face. For instance, the anti-rail-drawing portion can be formed by deposition of non-adhesive or low-adhesive particles on a prescribed location in the adhesive face. Such particles can be supplied to the adhesive face as a composition obtained by dispersing or dissolving the particles in a suitable medium. For instance, by supplying a colored or colorless pigment-containing composition, possibly a composition considered as ink or paint to an area inward from the winding end edge and an area inward from each row of cut holes (typically in the width direction of the PSA tape), the adhesive strength of the adhesive face in this area can be reduced or minimized to form an anti-rail-drawing portion. The composition can be supplied to the area, for instance, by applying or printing (e.g. inkjet printing, etc.) the composition by a known method. The composition can be supplied after the first and second layers are formed. Alternatively, the composition can be supplied, for instance, after the first layer is formed, but before the second layer is formed. In this case, the adhesive strength of the first layer is also reduced or minimized to reduce the adhesive strength of the adhesive face as a whole, whereby an effect to prevent rail drawing can be obtained.

In the art disclosed herein, the anti-rail-drawing portion may be a section where the first layer is not placed on the first face of the substrate in a prescribed region (in a band-shaped range running in the width direction of the PSA tape) inward from the winding end edge of the PSA tape or inward from each row of cut holes. The anti-rail-drawing portion in such an embodiment can be formed, for instance, by intermittently applying the PSA for forming the first layer in the length direction of the substrate. Alternatively, the anti-rail-drawing portion can be formed as follows: masking tape is adhered to an area of the first face of the substrate where an anti-rail-drawing portion is to be formed, over the masking tape, the first layer-forming PSA is continuously applied; subsequently, the masking tape is peeled off (i.e. the first layer formed on the masking tape is removed along with the masking tape).

The width of the anti-rail-drawing portion can be, for instance, 1 mm or greater. It is usually suitably 2 mm or greater (e.g. 3 mm or greater). With increasing width of the anti-rail-drawing portion, the anti-rail-drawing properties tend to be enhanced. The width of the anti-rail-drawing portion can be, for instance, 50 mm or less. From the standpoint of retaining the adhesive properties and preventing roll-loosening, the width of the anti-rail-drawing portion is usually suitably 30 mm or less, or preferably 15 mm or less (e.g. 10 mm or less). The anti-rail-drawing portion can be provided to an area outward (towards the winding end edge) from a tear-off location, in addition to the area inward from the tear-off location. For instance, the anti-rail-drawing portion can be provided across (to both sides of) a tear-off location and along the tear-off location.

Fourth Embodiment

The art disclosed herein can be favorably implemented in an embodiment using a substrate comprising a foam sheet in the PSA tape roll. With the use of a foam sheet as the substrate or a component thereof, good cushioning properties can be provided to the PSA tape and to the PSA tape roll obtained by winding the PSA tape. Specific examples of the material forming the foam sheet include polyolefinic resin foam such as PE foam and PP foam; polyester-based resin foam such as PET foam, polyethylene naphthalate foam, and polybutylene terephthalate foam; polyvinyl chloride-based resin foam such as polyvinyl chloride foam; vinyl acetate-based resin foam: polyphenylene sulfide resin foam; amide-based resin foam such as polyamide (nylon) resin foam and wholly aromatic polyamide (aramid) resin foam, polyimide-based resin foam; polyether ether ketone (PEEK) foam; styrene-based resin foam such as polystyrene foam: and urethane-based resin foam such as polyurethane resin foam. As the foam, rubber-based resin foam such as polychloroprene rubber foam can be used as well. As the foam, closed-cell foam is preferable.

Examples of preferable foam include polyolefinic resin foam. As the plastic material forming the polyolefinic foam (i.e. as the polyolefinic resin), various known or commonly-used polyolefinic resins can be used without particular limitations. Examples include PE such as low density PE (LDPE), linear low density PE (LLDPE), high density PE (HDPE), and metallocene catalyst-based linear low density PE: PP; ethylene-propylene copolymers; and ethylene-vinyl acetate copolymers. These polyolefinic resins can be used singly as one species or in a combination of two or more species. In particular, a preferable PE-based foam sheet is essentially formed of PE-based resin foam. Here, the PE-based resin refers to a resin whose primary monomer (i.e. the primary component among monomers) is ethylene, possibly including HDPE. LDPE and LLDPE as well as an ethylene-propylene copolymer and an ethylene-vinyl acetate copolymer with more than 50% ethylene by weight (copolymerization ratio).

The density (apparent density) of the foam sheet is not particularly limited. It is usually preferably 10 kg/m$^3$ to 200 kg/m$^3$, or more preferably 10 kg/m$^3$ to 100 kg/m$^3$ (typically 15 kg/m$^3$ to 50 kg/m). When the density is at or above the prescribed value, the strength of the foam sheet (and further of the PSA tape) as well as the handling properties tend to increase. On the other hand, when the density is at or below the prescribed value, the cushioning properties as well as the solid dirt-collecting ability and holding (anti-falling) properties of the same tend to increase. The density (apparent density) of the foam sheet can be determined by a method based on JIS K 6767:1999.

The tensile strength of the foam sheet (e.g. a polyolefinic foam sheet) is not particularly limited. For instance, the tensile strength in the length direction (MD) is preferably 0.25 MPa to 2.5 MPa (more preferably 0.3 MPa to 2.0 MPa, typically 0.5 MPa to 1.5 MPa). The tensile strength in the width direction (TD) is preferably 0.1 MPa to 1.8 MPa (more preferably 0.15 MPa to 1.2 MPa, typically 0.2 MPa to 0.6 MPa). When the tensile strength is in these ranges, the strength of the PSA tape increases, whereby greater handling properties can be obtained. The tensile strength of the foam sheet is determined based on JIS K 6767:1999.

The elongation of the foam sheet (e.g. a polyolefinic foam sheet) is not particularly limited. For instance, the MD elongation is preferably 20% to 400% (more preferably 20% to 300%, typically 25% to 100%). The TD elongation is preferably 15% to 300% (more preferably 20% to 200%, typically 25% to 100%) An elongation in these ranges tends to bring about greater solid dirt-collecting ability and strength of the PSA tape. The elongation of the foam sheet is determined based on JIS K 6767:1999.

The tear strength of the foam sheet (e.g. a polyolefinic foam sheet) is not particularly limited. For instance, the MD tear strength is preferably 15 N/m to 120 N/m (more preferably 15 N/m to 80 N/m, typically 20 N/m to 50 N/m). The TD tear strength is preferably 6 N/m to 100 N/m (more preferably 8 N/m to 60 N/m, typically 10 N/m to 30 N/m). The tear strength in these ranges tends to bring about, for instance, greater handling properties for renewing the outer surface of the sticky cleaner, etc., along with greater strength. The tear strength of the foam sheet is determined based on JIS K 6767:1999.

The permanent compression set of the foam sheet (e.g. a polyolefinic foam sheet) is not particularly limited. As the support substrate, it is preferable to use a foam sheet that exhibits a permanent compression set of, for instance, about 3.0% to 15.0% (more preferably 5.0% to 15.0%, typically 6.0% to 12.0%). A permanent compression set in these ranges tends to further enhance the solid dirt-collecting ability and the strength of the PSA tape. The permanent compression set of the foam sheet is determined based on JIS K 6767:1999.

On the second face (backside) of the substrate, an approximately 1 μm to 500 μm (e.g. 5 μm to 300 μm, typically 10 μm to 200 μm) thick release layer formed from a non-polar resin and the like is preferably formed. As the non-polar resin, a polyolefin such as polyethylene (e.g. VLDPE. LLDPE) can be preferably used. In addition to or in place of the release layer, a surface treatment (a release treatment to prevent an excessive increase in unwinding force) such as coating of a silicone-based release agent and the like can be provided.

With respect to other features besides the substrate material, the PSA tape roll with a substrate using such a foam sheet can be constituted in the same manner as the PSA tape rolls according to the respective embodiments described earlier. The art disclosed herein can be implemented, for instance, in an embodiment where a polyolefinic foam sheet is used as the substrate of the PSA tape roll 10 in the first embodiment.

The matters disclosed herein include the following:

(1) A sticky cleaner comprising a PSA tape having an adhesive face on a first face of a substrate, wherein the PSA tape constitutes a PSA tape roll wound with the adhesive face on the outside, on the first face of the substrate, the PSA tape has a first layer formed of a PSA and a second layer formed of a viscoelastic material, the adhesive face comprises a first section where the first layer is exposed and a second section where the second layer is exposed, the second section protrudes further out of the PSA tape roll, relative to the first section, and the PSA tape roll exhibits an unwinding force $F_0$ at 0° C. and an unwinding force $F_{30}$ at 30° C., $F_0$ being up to 10 times $F_{30}$.

(2) The sticky cleaner according to (1) above wherein the viscoelastic material forming the second layer is an acrylic viscoelastic material.

(3) The sticky cleaner according to (1) or (2) above wherein the viscoelastic material forming the second layer is an acrylic PSA.

(4) The sticky cleaner according to any of (1) to (3) above wherein a plurality of the second sections are formed, separated by spaces in the width direction.

(5) The sticky cleaner according to any of (1) to (4) wherein the second section is formed in a line running in the length direction of the PSA tape.

(6) The sticky cleaner according to any of (1) to (5) above wherein the second layer is formed in lines running in the length direction of the PSA tape, separated by spaces in the width direction of the PSA tape.

(7) The sticky cleaner according to any of (1) to (6) above wherein the second layer is partially formed over the first layer.

(8) The sticky cleaner according to any of (1) to (6) above wherein the second layer is directly formed on the first face of the substrate.

(9) The sticky cleaner according to any of (1) to (8) above wherein the second layer is larger in thickness than the first layer.

(10) The sticky cleaner according to any of (1) to (9) above wherein the substrate is selected from laminates comprising one, two or more among paper, resin film and a foam sheet.

(11) The sticky cleaner according to any of (1) to (10) above wherein depressions are formed in the second face of the substrate, with the depressions serially arranged in a continuous or intermittent straight line intersecting the length direction of the PSA tape.

(12) The sticky cleaner according to any of (1) to (11) above wherein the second layer comprises an acrylic block copolymer as the base polymer.

(13) The sticky cleaner according to (12) above wherein the acrylic block copolymer comprises a soft segment and a hard segment, with the soft segment comprising a monomer unit derived from n-butyl acrylate.

(14) The sticky cleaner according to (13) above wherein the soft segment comprises a monomer unit derived from n-butyl acrylate and a monomer unit derived from 2-ethyl-hexyl acrylate.

(15) The sticky cleaner according to any of (1) to (14) above wherein the second layer comprises a filler.

(16) The sticky cleaner according to (15) above wherein the filler accounts for about 10% or higher and about 50% or lower by weight of the second layer.

(17) The sticky cleaner according to any of (1) to (16) above wherein the second layer has a cross-sectional area A (mm$^2$) in the width direction of the PSA tape and a percent (%) weight R of the elastomer content in the second layer, having a product (an AR value) equal to or less than 2.5.

(18) The sticky cleaner according to (17) above wherein the AR value is about 0.5 or greater and about 2.3 or less.

(19) The sticky cleaner according to any of (1) to (18) above wherein the second layer has a cross-sectional area of 0.005 mm$^2$ or greater and 0.1 mm$^2$ or less in a cross section in the width direction of the PSA tape.

(20) The sticky cleaner according to any of (1) to (19) above wherein the first layer is a rubber-based PSA layer.

(21) The sticky cleaner according to any of (1) to (20) above wherein the PSA tape has cut holes running in a direction intersecting the length direction of the PSA tape.

(22) The sticky cleaner according to any of (1) to (21) above wherein the PSA tape has an anti-rail-drawing portion where the adhesiveness of the PSA tape is reduced, in an area up to one-fourth the circumference inward from the winding end edge of the PSA tape.

(23) The sticky cleaner according to (22) above wherein the anti-rail-drawing portion is formed of a sheet member placed on the adhesive face, with the sheet member having a non-adhesive or low-adhesive outer face.

(24) The sticky cleaner according to (22) above wherein the anti-rail-drawing portion is formed by depositing non-adhesive or low-adhesive particles onto the adhesive face.

(25) A sticky cleaner comprising a PSA tape roll in which a PSA tape having an adhesive face on a first face of a substrate is wound with the adhesive face on the outside, wherein the PSA tape comprises, on the first face of the substrate, a first layer formed of a PSA and a second layer formed of a viscoelastic material, the second layer is formed in lines running in the length direction of the PSA tape, and the second layer has a cross-sectional area A (mm$^2$) in a cross section in the width direction of the PSA tape and a percent (%) weight R of the elastomer content in the second layer, having a product (an AR value) equal to or less than 2.5.

EXAMPLES

Several worked examples relating to the present invention are described below, but the present invention is not intended to be limited to these examples. In the description below, "parts" and "%" are based on weight unless otherwise specified.

<Fabrication of PSA Tape Rolls>

Example 1

As described below, was fabricated a PSA tape roll having a first layer formed of a rubber-based PSA and a second layer formed of an acrylic viscoelastic material on a first face of a substrate.

As the rubber-based PSA for forming the first layer, was used SIS-based PSA formed from 100 parts of SIS as the base polymer, 130 parts of tackifier resin and 100 parts of process oil. As the SIS, was used trade name QUINTAC 3520 available from Zeon Corporation. As the tackifier resin, was used trade name T-REZ RC093 available from Tonen General Sekiyu K. K. As the process oil, was used trade name DIANA PROCESS OIL NS90S available from Idemitsu Kosan Co., Ltd.

Were kneaded 100 parts of acrylic polymer as the base polymer, 160 parts of filler master batch, 50 parts of acrylic oligomer and 2.4 parts of blue pigment to prepare the acrylic viscoelastic material (PSA) for forming the second layer. As the acrylic polymer, was used an acrylic block copolymer synthesized by a known living anionic polymerization method. This acrylic block copolymer has a tri-block structure of polyMMA block-poly2EHA/BA block-polyMMA block (or MMA-2EHA/BA-MMA hereinafter). The 2EHA to BA ratio (copolymerization ratio) by weight in the poly2EHA/BA block was approximately 50/50. The polyMMA block (two polyMMA blocks combined) to poly2EHA/BA block ratio (MMA/(2EHA+BA)) by weight was about 18/82. The acrylic polymer A had a Mw of $10 \times 10^4$ and a Mn of $8.4 \times 10^4$; with Mw/Mn being 1.21. The filler master batch used contained calcium carbonate particles (filler) and polyethylene resin at a weight ratio of 8:2. As the acrylic oligomer, was used trade name ALFON UP-1000 (functional group-free acrylic oligomer with Mw of about 3000) available from Toagosei Co., Ltd. The percent (%) weight R of the elastomer content in the acrylic viscoelastic material was 58%.

Using a double-screw extruder equipped with an extrusion die, the rubber-based PSA and the acrylic viscoelastic material were heated, melted, and extruded from the die, applied to a first face of a substrate to fabricate a PSA tape having a similar cross-sectional structure to PSA tape 12 shown in FIG. 2. As substrate 20, was used a substrate obtained by laminating pure white paper (40 g grammage, 50 μm thick, 160 mm wide) with 20 μm thick polyethylene film on the second face (opposite from the face where the adhesive face was formed, i.e. the backside). A 150 mm wide band of the first layer 31 was formed in a central area of the width of substrate 20. The thickness T1 of the first layer 31 was 15 μm. Over the first layer 31, were formed 73 straight lines of the second layer 32 running in the length direction of PSA tape 12 spaced apart by an approximately constant pitch P (about 2 mm here). Each line of the second layer 32 had a width W2 of 0.37 mm. By this, on the first face 20A of substrate 20, was formed a 150 mm wide adhesive face 35 comprising first sections 31A as parts of the first layer 31 not covered with the second layer 32 and second sections 32A where the PSA layer 32 was exposed. On the adhesive face 35, the protruding height T2 of the second sections 32A relative to the first sections 31A was 70 μm.

The PSA tape in the embodiment above was wound with the adhesive face on the outside to obtain a PSA tape roll according to this Example.

Example 2

In place of the acrylic viscoelastic material for forming the second layer in Example 1, was used CEBC-based viscoelastic material (PSA) formed from 100 parts of CEBC as the base polymer, 50 parts of tackifier resin, 100 parts of process oil and 2.4 parts of blue pigment. As the CEBC, was used trade name DYNARON 6200P available from JSR Corporation. As the tackifier resin, was used trade name CLEARON P-105 available from Yasuhara Chemical Co., Ltd. As the process oil, was used trade name DIANA PROCESS OIL PW-90 available from Idemitsu Kosan Co., Ltd. Otherwise in the same manner as Example 1, was obtained a PSA tape roll according to this Example. The percent (%) weight R of the elastomer content in the CEBC-based viscoelastic material was 99%.

<Measurements and Evaluations>
(Determination of Unwinding Force)

With respect to the PSA tape roll of each Example, the unwinding force was determined at 0° C., 20° C. and 30° C. Five measurements (n=5) were taken at each measurement temperature. From the unwinding forces $F_0$ at 0° C. and $F_{30}$ at 30° C., the unwinding force ratio ($F_0/F_{30}$) was determined. The results are shown in Table 1.

(Unwinding Workability)

The PSA tape roll according to each Example was stored in an environment at 0° C. for at least one hour. Subsequently, a tester held the outer terminal of the PSA tape (the winding end edge) by hand and withdrew it in the tangential direction at a rate of about 1000 mm/min. For each Example, the test (withdrawal) was carried out five times. Based on how this operation worked out, the unwinding workability was graded on the following two-grade scale:

E: No tearing or splitting of PSA tape occurred (excellent unwinding workability)

P: Tearing or splitting occurred at least once (poor unwinding workability)

(Anti-Roll-Loosening Properties)

The PSA tape roll according to each Example was kept standing on a horizontal test board with the winding axis in the vertical direction and stored at 23° C. and 50% RH for two hours. Subsequently, with respect to the top side of the PSA tape roll standing on the test board, was visually inspected whether or not peeling (lifting) of the winding end edge of the PSA tape from the inner part of the PSA tape roll had occurred. Anti-roll-loosening properties were evaluated on the following two-grade scale:

E: No peeling of PSA tape observed or the length of the peeled part of PSA tape was 1 cm or less from the winding end edge (excellent anti-roll-loosening properties)

P: Peeling of PSA tape occurred over a length of 5 cm or greater from the winding end edge (poor anti-roll-loosening properties)

The test results are shown in Table 1.

TABLE 1

| | Unwinding force (N/150 mm) | | | Unwinding force ratio | Unwinding workability | Anti-roll-loosening properties |
|---|---|---|---|---|---|---|
| | 0° C. | 20° C. | 30° C. | ($F_0/F_{30}$) | | |
| Ex. 1 | 2.3 | 1.9 | 0.8 | 2.9 | E | E |
| Ex. 2 | 7.1 | 0.5 | 0.2 | 35.5 | P | P |

As shown in Table 1, the PSA tape roll of Example 1 whose unwinding force exhibited low dependence on temperature was easy to unwind even at a low temperature while showing great anti-roll-loosening properties at room temperature.

(Determination of Rotational Resistance)

The rotational resistance of the PSA tape roll according to each Example was determined with respect to three different target surfaces, namely, a carpet (an acrylic carpet available from Sun Holiday, trade name HD1, pile length 6 mm (loop)), a waxed flooring material (Daiken Corporation, MIRAGE F-series), and a wax-free flooring material (Daiken Corporation, LVAT-MW).

Figure 4:
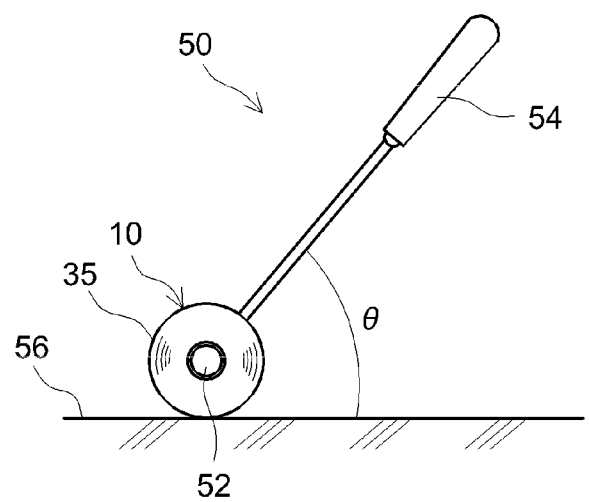
FIG. 4 shows a diagram viewed in the direction of arrow IV in FIG. 3.

In particular, to a rolling member 52 of a jig 50 having a shape outlined in FIGS. 3 and 4, was attached PSA tape roll 10 after stored under the conditions described above. In a measurement environment at 23° C. and 50% RH, grip 54 of jig 50 was lightly held by a tester and rolled over a surface 56 to be cleaned at a rate of about 30 m/min at an angle θ of 55° (θ=angle between the shaft of jig 50 and surface 56 being cleaned). During this, the force exerted on grip 54 (i.e. the rotational resistance) was determined with a digital force gauge.

TABLE 2

| | Rotational resistance (N/150 mm) | | |
|---|---|---|---|
| | Carpet | Flooring (waxed) | Flooring (not waxed) |
| Ex. 1 | 7.3 | 5.0 | 7.9 |
| Ex. 2 | 9.7 | 6.6 | 16.6 |

As shown in Table 2, the sticky cleaner using the PSA tape roll according to Example 1 operated smoothly on all target surfaces with adequate operational feelings. As compared to Example 2, the PSA tape roll according to Example 1 varied little in rotational resistance in relation to the types of target surface and was suitable for use on a wax-free flooring surface as well.

(Tensile Test)

With respect to the viscoelastic material used for forming the second layer in each Example, its breaking strength and the elongation at break were determined. Each viscoelastic material in a hot melt state was allowed to cool on a release liner to form a 1 mm thick sheet. This was die-cut to prepare a test piece for the measurement. The results are shown in Table 3.

(Anti-Stringiness Properties)

With respect to the PSA tape according to each Example, while the PSA tape was torn off, the degree of stringiness of the second layer was evaluated. In particular, for the PSA tape according to each Example, at one end of the width direction (at one lengthwise end), a cut of about 2 cm in length running in the width direction was made with scissors. The PSA tape was hand-held at both sides of the cut and pulled apart approximately in the length direction (in the running direction of the second layer) to tear a piece of the PSA tape off the rest. During this, with respect to the second layer, whether or not sticky strings formed was visually inspected. When significant sticky string formation was observed, the anti-stringiness was graded "P" (poor anti-stringiness); when no notable sticky string formation was observed, it was graded "E" (excellent anti-stringiness). The results are shown in Table 3. Table 3 also shows the cross-sectional area A of the second layer and the percent weight R of the elastomer content in the viscoelastic material forming the second layer.

TABLE 3

| | Elongation at break (%) | Breaking strength (N/10 mm) | Cross-sectional area A (mm$^2$) | % weight R of elastomer | AR value | Anti-stringiness |
|---|---|---|---|---|---|---|
| Ex. 1 | 298 | 5.3 | 0.0259 | 58 | 1.50 | E |
| Ex. 2 | 2998 | 12.3 | 0.0259 | 99 | 2.56 | P |

As shown in Table 3, with respect to the PSA tape of Example 1 with a low AR value, the anti-stringiness was clearly superior to that of the PSA tape of Example 2.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1 sticky cleaner
10, 110 PSA tape roll
12, 112 PSA tape
14 roll core
20, 120 substrate
20A, 120A first faces
20B. 120B second faces
22, 23 non-adhesive areas (dry edges)
24 cut hole
31, 131 first layers
31A, 131A first sections
32, 132 second layers
32A, 132A second sections
35, 135 adhesive faces
50 jig
90 lead tape
126 depression

The invention claimed is:

1. A sticky cleaner comprising a pressure-sensitive adhesive tape having an adhesive face on a first face of a substrate, wherein
   the pressure-sensitive adhesive tape constitutes a pressure-sensitive adhesive tape roll wound with the adhesive face on the outside,
   on the first face of the substrate, the pressure-sensitive adhesive tape has a first layer formed of a pressure-sensitive adhesive and a second layer formed of a viscoelastic material,
   the second layer is partially formed over the first layer,
   the first layer is a rubber-based pressure-sensitive adhesive layer,
   the viscoelastic material forming the second layer is an acrylic viscoelastic material comprising an acrylic block copolymer as its base polymer,
   the adhesive face comprises a first section where the first layer is exposed and a second section where the second layer is exposed,
   the second section protrudes further out of the pressure-sensitive adhesive tape roll, relative to the first section,
   the acrylic block copolymer is essentially free of monomer units other than alkyl(meth)acrylate units,
   the second layer has a cross-sectional area A (mm$^2$) in the width direction of the pressure-sensitive adhesive tape and a percent (%) weight R of the elastomer content in the second layer, where a product of the numerical value A and the numerical value R equals to or is less than 2.5,
   the pressure-sensitive adhesive tape roll exhibits an unwinding force $F_0$ at 0° C. and an unwinding force $F_{30}$ at 30° C., $F_0$ being 1 times or more and up to 10 times $F_{30}$, and
   the unwinding force $F_{30}$ is 0.3 N/150 mm or greater.

2. The sticky cleaner according to claim 1 wherein a plurality of the second sections are formed, separated by spaces in the width direction.

3. The sticky cleaner according to claim 1 wherein the second section is formed in a line running in the length direction of the pressure-sensitive adhesive tape.

4. The sticky cleaner according to claim 1 wherein lines of the second layer are placed, running in the length direction of the pressure-sensitive adhesive tape, separated by spaces in the width direction of the pressure-sensitive adhesive tape.

5. The sticky cleaner according to claim 1 wherein the acrylic block copolymer comprises a soft segment and a hard segment, with the soft segment comprising a monomer unit derived from n-butyl acrylate.

6. The sticky cleaner according to claim 1 wherein the second layer comprises a filler.

7. The sticky cleaner according to claim 1 having cut holes running in a direction intersecting the length direction of the pressure-sensitive adhesive tape.

8. The sticky cleaner according to claim 1 having an area up to one-fourth its circumference inward from the winding end edge of the pressure-sensitive adhesive tape, with the area provided with an anti-rail-drawing portion where the pressure-sensitive adhesive tape exhibit reduced adhesiveness.

9. A sticky cleaner comprising a pressure-sensitive adhesive tape having an adhesive face on a first face of a substrate, wherein
the pressure-sensitive adhesive tape constitutes a pressure-sensitive adhesive tape roll wound with the adhesive face on the outside,
on the first face of the substrate, the pressure-sensitive adhesive tape has a first layer formed of a pressure-sensitive adhesive and a second layer formed of a viscoelastic material,
the second layer is partially formed over the first layer,
the first layer is a rubber-based pressure-sensitive adhesive layer,
the viscoelastic material forming the second layer is an acrylic viscoelastic material comprising an acrylic block copolymer as its base polymer,
the adhesive face comprises a first section where the first layer is exposed and a second section where the second layer is exposed,
the second section protrudes further out of the pressure-sensitive adhesive tape roll, relative to the first section,
a plurality of the second layers are formed in lines running in the length direction of the pressure-sensitive adhesive tape, separated by spaces in the width direction of the pressure-sensitive adhesive tape, each of the lines has a width W2 of 0.1 mm or greater and 0.7 mm or less and has a thickness T2 of 50 µm or greater and 100 µm or less,
the second layer has a cross-sectional area A (mm$^2$) in the width direction of the pressure-sensitive adhesive tape and a percent (%) weight R of the elastomer content in the second layer, where a product of the numerical value A and the numerical value R equals to or is less than 2.5,
the pressure-sensitive adhesive tape roll exhibits an unwinding force $F_0$ at 0° C. and an unwinding force $F_{30}$ at 30° C., $F_0$ being 1 times or more and up to 10 times $F_{30}$, and
the unwinding force $F_{30}$ is 0.3 N/150 mm or greater.

10. The sticky cleaner according to claim 1, wherein the second layer comprises an oligomer selected from the group consisting of acrylic oligomers and acrylic urethane-based oligomers.

11. The sticky cleaner according to claim 10, wherein an amount of the oligomer is 10 parts by weight or greater and 80 parts by weight or less based on 100 parts by weight of the base polymer.

12. The sticky cleaner according to claim 10, wherein the oligomer has a weight average molecular weight (Mw) of 800 or greater and 30000 or less.

13. The sticky cleaner according to claim 1, wherein the second layer is essentially free of a plasticizer.

14. The sticky cleaner according to claim 6, wherein a percent weight of the filler in the second layer is 3% or higher and 60% or lower.

15. The sticky cleaner according to claim 14, wherein the filler comprises a pigment.

* * * * *